(12) United States Patent
Han et al.

(10) Patent No.: US 11,846,061 B2
(45) Date of Patent: Dec. 19, 2023

(54) WASHING MACHINE AND VIBRATION REDUCTION APPARATUS THEREOF

(71) Applicant: SAMSUNG ELECTRONICS CO., LTD., Suwon-si (KR)

(72) Inventors: Wonjae Han, Suwon-si (KR); Doyeon Kim, Suwon-si (KR); Jeonghoon Kang, Suwon-si (KR); Hansol Youn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 17/112,463

(22) Filed: Dec. 4, 2020

(65) Prior Publication Data

US 2021/0172106 A1    Jun. 10, 2021

(30) Foreign Application Priority Data

Dec. 4, 2019  (KR) .................. 10-2019-0159839

(51) Int. Cl.
| | | |
|---|---|---|
| *D06F 37/24* | (2006.01) | |
| *D06F 23/04* | (2006.01) | |
| *D06F 37/26* | (2006.01) | |
| *F16F 7/04* | (2006.01) | |

(52) U.S. Cl.
CPC .............. *D06F 37/24* (2013.01); *D06F 23/04* (2013.01); *D06F 37/268* (2013.01); *F16F 7/04* (2013.01); *F16F 2222/04* (2013.01); *F16F 2232/02* (2013.01); *F16F 2234/02* (2013.01)

(58) Field of Classification Search
CPC ........ D06F 37/24; D06F 37/268; D06F 23/04; F16F 7/04; F16F 2222/04; F16F 2232/02; F16F 2234/02

USPC .......................................................... 68/212
See application file for complete search history.

(56) References Cited

U.S. PATENT DOCUMENTS

| | | | |
|---|---|---|---|
| 2011/0167878 A1 | 7/2011 | De Angelo Sanchez et al. | |
| 2017/0183802 A1 | 6/2017 | Yu et al. | |
| 2018/0051407 A1 | 2/2018 | Chi et al. | |
| 2018/0142403 A1* | 5/2018 | Han | ............... D06F 37/20 |

FOREIGN PATENT DOCUMENTS

| | | |
|---|---|---|
| CN | 207919165 | 9/2018 |
| JP | 2007-232126 | 9/2007 |
| KR | 1996-0004302 | 5/1996 |
| KR | 20-0159084 | 10/1999 |
| KR | 20-0320745 | 7/2003 |

(Continued)

OTHER PUBLICATIONS

CN207919165U—machine translation (Year: 2018).*

(Continued)

*Primary Examiner* — Tinsae B Ayalew
(74) *Attorney, Agent, or Firm* — STAAS & HALSEY LLP

(57) ABSTRACT

A washing machine includes a cabinet, a tub disposed inside the cabinet, and a rotating tub rotatably disposed inside the tub. A suspension device connects the tub to the cabinet such that the tub is supported by the cabinet, and a vibration reduction apparatus is coupled between the tub and the suspension device to reduce vibration of the tub according to rotation of the rotating tub. The vibration reduction apparatus includes a first rod and a second rod rotatably coupled to the first rod.

16 Claims, 21 Drawing Sheets

(56) References Cited

FOREIGN PATENT DOCUMENTS

| KR | 10-1217118 | 12/2012 |
|----|------------|---------|
| KR | 10-2015-0011221 | 1/2015 |
| KR | 20150011215 A | 1/2015 |
| KR | 20150011257 A | 1/2015 |
| KR | 20160111197 A | 9/2016 |
| KR | 20160149976 A | 12/2016 |
| KR | 10-2018-0057484 | 5/2018 |
| KR | 101934735 B1 | 1/2019 |
| WO | 2016/193835 | 12/2016 |

OTHER PUBLICATIONS

JP2007232126A—machine translation (Year: 2007).*
International Search Report dated Mar. 18, 2021 from International Application No. PCT/KR2020/017395, 3 pages.

* cited by examiner

WASHING MACHINE AND VIBRATION REDUCTION APPARATUS THEREOF

CROSS-REFERENCE TO RELATED APPLICATIONS

This application is based on and claims priority under 35 U.S.C. § 119 to Korean Patent Application No. 10-2019-0159839, filed on Dec. 4, 2019 in the Korean Intellectual Property Office, the disclosure of which is incorporated herein by reference.

BACKGROUND

1. Field

The disclosure relates to a washing machine, and more specifically, to a washing machine provided with a vibration reduction apparatus to reduce vibration of a tub according to rotation of a drum in a spin-drying process.

2. Description of the Related Art

A washing machine is a household appliance that washes laundry, such as clothes, using electric power, and is classified into a pulsator type washing machine in which a pulsator provided inside a rotating tub rotates to generate water current and laundry is washed by the generated water current, and a drum-type washing machine in which lifters are formed on an inner circumferential surface of a rotating tub and laundry is lifted and dropped with the lifters so that the laundry is washed.

In general, the pulsator-type washing machine has a top-loading method in which an opening through which laundry is put into a rotating tub is formed in the top of the main body, and the drum-type washing machine has a front-loading method in which an opening through which laundry is put into a rotating tub is formed in the front of the main body.

The pulsator-type washing machine includes a cabinet forming the external appearance, a tub accommodating washing water, and a rotating tub accommodating laundry and rotatably provided inside the tub, and the tub is supported against the cabinet by a suspension device.

During a spin-drying process, the rotating tub rotates at a high speed, and the rotating tub may perform precession according to weight imbalance of laundry contained in the rotating tub, and the precession of the rotating tub may cause vibration of the tub. The suspension device may be effective in reducing the vibration in the vertical direction of the tub, but not the vibration in the horizontal direction of the tub.

SUMMARY

Therefore, it is an object of the disclosure to provide a vibration reduction apparatus for effectively reducing the vibration in the horizontal direction of the tub generated during rotation of the rotating tub, and a washing machine having the same.

It is another object of the disclosure to provide a vibration reduction apparatus having an improved vibration reduction and preventing deformation of the suspension device, and a washing machine having the same.

It is another object of the disclosure to provide a vibration reduction apparatus for reducing vibration of a tub at a transient vibration section in which a large vibration occurs in the tub due to resonance, and preventing vibration of a tub from being transmitted to a cabinet in a normal section in which vibration of the tub is small, such as the highest revolution per minutes (RPM) section, and a washing machine having the same.

Additional aspects of the disclosure will be set forth in part in the description which follows and, in part, will be obvious from the description, or may be learned by practice of the disclosure.

According to an aspect of the disclosure, there is provided a washing machine including: a cabinet; a tub disposed inside the cabinet; a rotating tub rotatably disposed inside the tub; a suspension device connecting the tub to the cabinet such that the tub is supported by the cabinet; and a vibration reduction apparatus installed between the tub and the suspension device to reduce vibration of the tub according to rotation of the rotating tub, and including a first rod and a second rod rotatably coupled to the first rod.

The first rod may be connected to the tub, and the second rod is connected to the suspension device.

The first rod may include a hinge pin, and the second rod rotates around the hinge pin.

The second rod may include a suspension device connection portion connected to the suspension device, the suspension device may include a suspension bar elongated in one direction, and the suspension device connection portion may be connected to the suspension bar so as to be movable along the suspension bar.

The suspension device connection portion may include a holder having a connection groove into which the suspension bar is inserted and a bracket to which the holder is rotatably coupled.

The first rod may include a disk formed at a circumference of the hinge pin, and the second rod may include a disk housing into which the disk is inserted.

The disk may be provided in a cylindrical shape having an upper surface, a lower surface, and a circumferential surface, and the disk housing may include a first wall and a second wall spaced apart from each other to form a slot into which the disk is inserted.

The washing machine may further include a friction member provided inside the disk housing to come in friction with the disk when the second rod rotates around the hinge pin.

The disk housing may include a mounting rib formed on at least one of an inner surface of the first wall or an inner surface of the second wall such that the friction member is mounted on the mounting rib.

The disk may include a thickness increasing portion, a thickness of which increases such that a frictional force increases according to a rotation angle of the second rod.

According to another aspect of the disclosure, there is provided a vibration reduction apparatus for a washing machine including a cabinet, a tub disposed inside the cabinet, and a suspension device connecting the tub to the cabinet, the vibration reduction apparatus including: a first rod including a tub connection portion connected to the tub of the washing machine and a first rod having a first hinge portion; and a second rod including a suspension device connection portion connected to the suspension device and a second rod having a second hinge portion rotatably coupled to the first hinge portion.

The first hinge portion may include a disk and a hinge pin provided on a center of the disk, wherein the second hinge portion may include a disk housing into which the disk is inserted and a hinge pin insertion hole formed in the disk housing such that the hinge pin is inserted into the hinge pin insertion hole.

The suspension device may include a suspension bar elongated in one direction, and the suspension device connection portion may be connected to the suspension bar so as to be movable along the suspension bar.

The vibration reduction apparatus may further include a friction member provided inside the disk housing to come in friction with the disk when the second rod rotates around the hinge pin.

The disk may include a thickness increasing portion, a thickness of which increases such that a frictional force increases according to a rotation angle of the second rod.

According to another aspect of the disclosure, there is provided a washing machine including: a cabinet having a front plate, a rear plate, both side plates, and a bottom plate; a tub disposed inside the cabinet; a rotating tub rotatably disposed inside the tub; and a plurality of vibration reduction apparatuses installed between the cabinet and the tub in parallel with the bottom plate of the cabinet to reduce vibration of the tub according to rotation of the rotating tub, wherein the plurality of vibration reduction apparatuses includes a first vibration reduction apparatus and a second vibration reduction apparatus each formed to be extended and contracted in a length direction thereof, and a longitudinal central axis of the first vibration reduction apparatus and a longitudinal central axis of the second vibration reduction apparatus are positioned in line with each other.

The first vibration reduction apparatus and the second vibration reduction apparatus may be installed between the tub and the rear plate of the cabinet to be in parallel with the rear plate of the cabinet.

Each of the plurality of vibration reduction apparatuses may include a cylinder connected to the tub and having an inner space and a piston connected to the cabinet and provided to advance and retract in the inner space of the cylinder.

The cabinet may be provided with a guide bar, the tub may be provided with a support pin, and each of the plurality of vibration reduction apparatuses may have one end connected to the guide bar so as to be rotatable on the guide bar while moving in a vertical direction along the guide bar, and an other end connected to the support pin so as to be rotatable on the support pin while being restricted from moving in the vertical direction.

The cabinet may be provided with a support pin, the tub may be provided with a guide bar, and each of the plurality of vibration reduction apparatuses may have one end connected to the guide bar so as to be rotatable on the guide bar while moving in a vertical direction along the guide bar, and an other end connected to the support pin so as to be rotatable on the support pin while being restricted from moving in the upper and lower side directions.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure.

Hereinafter, embodiments of the disclosure will be described in detail with reference to the accompanying drawings.

Figure 1:
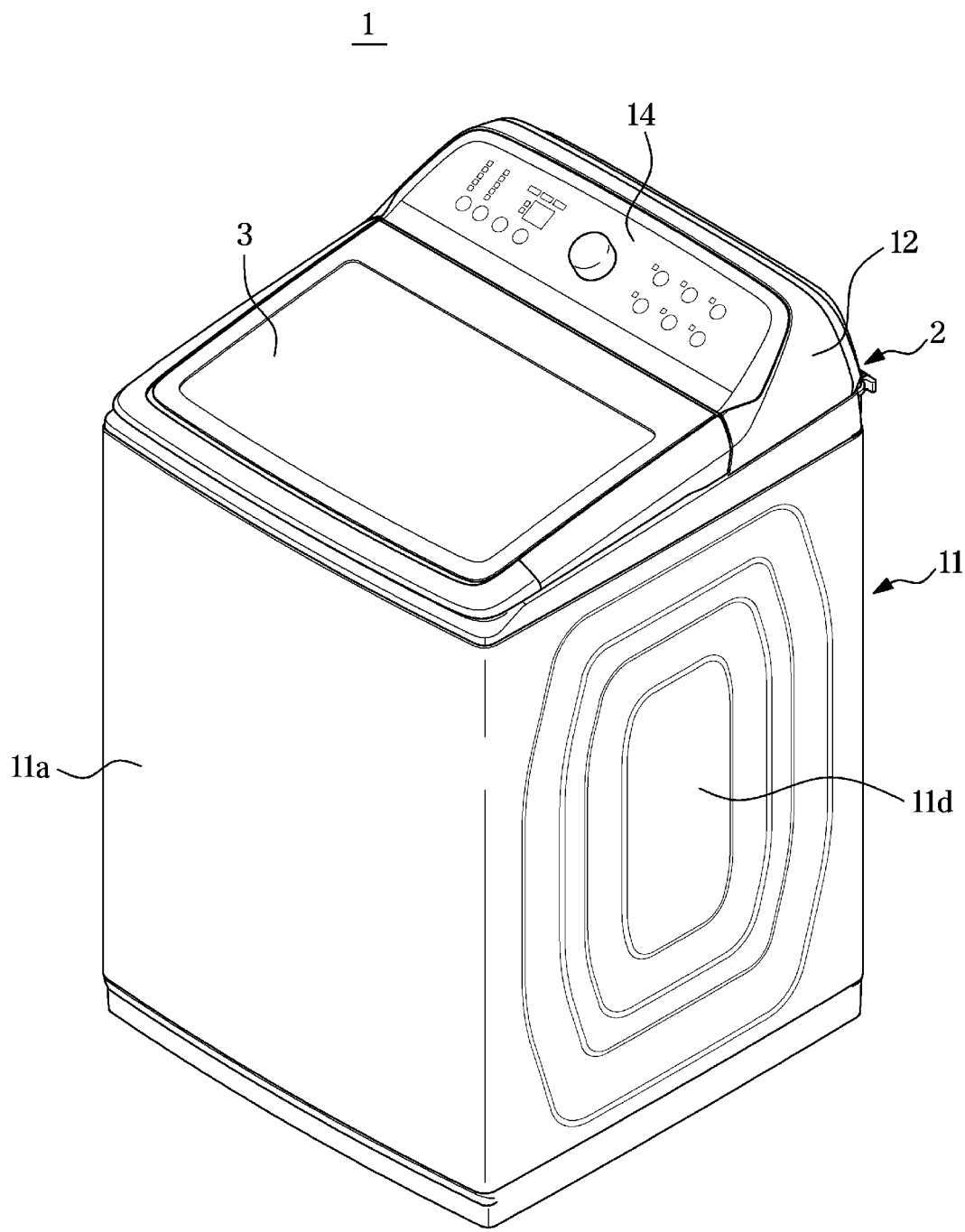
FIG. 1 is a view illustrating the external appearance of a washing machine according to an embodiment of the disclosure.
Figure 2:
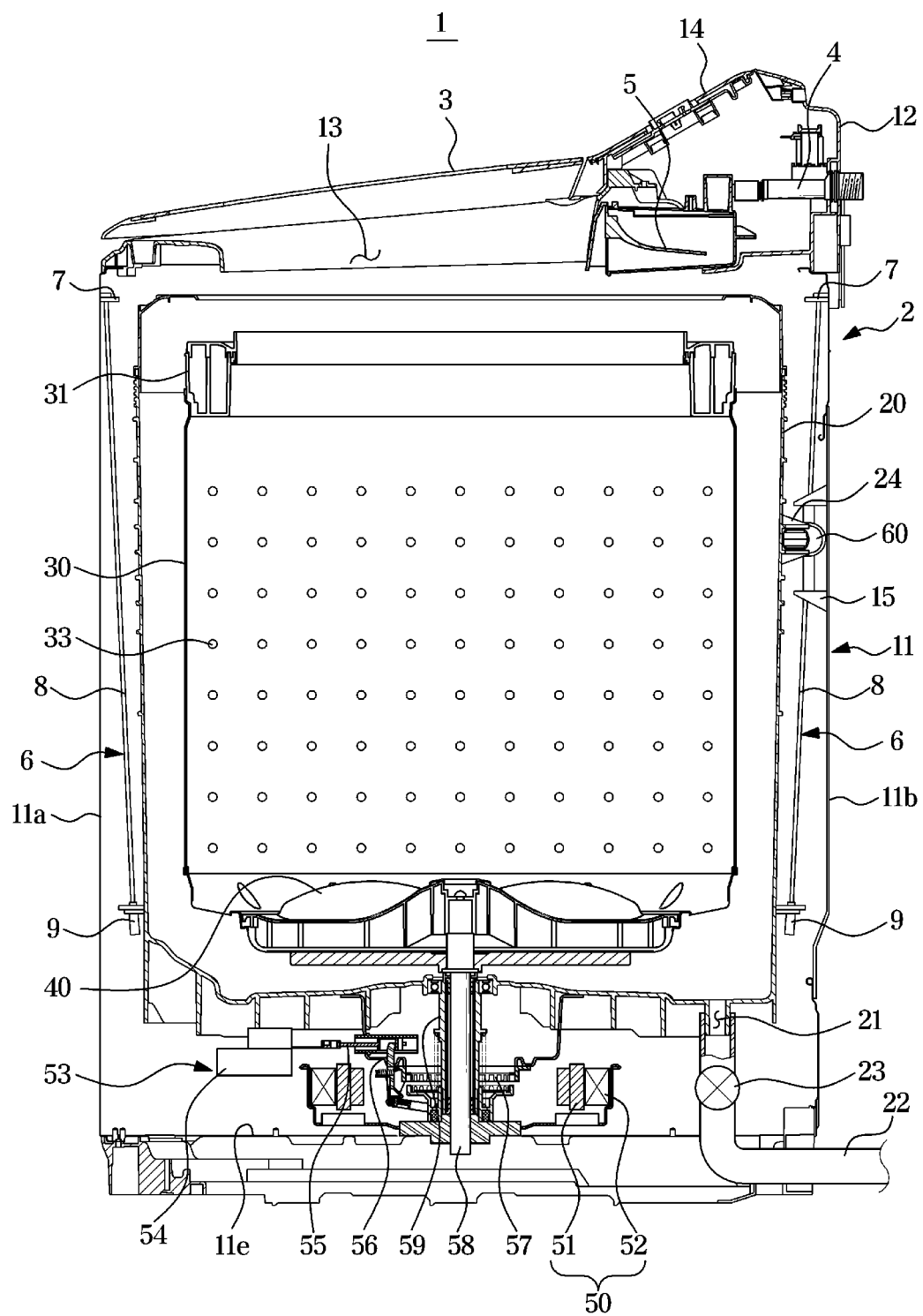
FIG. 2 is a side cross-sectional view schematically illustrating main parts of the washing machine of FIG. 1.

FIG. 1 is a view illustrating the external appearance of a washing machine according to an embodiment of the disclosure. FIG. 2 is a side cross-sectional view schematically illustrating main parts of the washing machine of FIG. 1.

Referring to FIGS. 1 to 2, a washing machine 1 includes a main body 2, a tub 20 provided inside the main body 2 and storing washing water, a rotating tub 30 rotatably provided in the tub 20 and accommodating laundry, and a pulsator 40 rotatably provided in the rotating tub 30 to generate washing water.

The main body 2 includes a cabinet 11 and a top cover 12 coupled to an upper portion of the cabinet 11. The top cover 12 is provided with an inlet 13 through which laundry may be injected into the rotating tub 30, and the inlet 13 may be opened and closed by a door 3. A control panel 14 for displaying operation information of the washing machine 1 or receiving an operation command may be provided on the top cover 12.

The cabinet 11 may have a box shape. That is, the cabinet 11 may have a front plate 11a, a rear plate 11b, a left side plate 11c, a right-side plate 11d, and a bottom plate 11e.

The tub 20 is provided in a cylindrical shape with an open top surface to store washing water. The tub 20 may be suspended from the cabinet 11 by a suspension device 6. The suspension device 6 may be provided at four corners of the cabinet 11.

The suspension device 6 may include a suspension bar 8 elongated in the vertical direction, a suspension cap 7 configured to couple an upper end of the suspension bar 8 to the cabinet 11 and couple a lower end of the suspension bar 8 to the tub 20, and a spring 9 provided at the lower end of the suspension bar 8 to reduce vibration of the tub 20. The spring 9 may reduce the vibration of the tub 20 in the vertical direction.

A drain hole 21 for draining the washing water stored in the tub 20 to the outside of the tub 20 may be formed in a lower portion of the tub 20. A drain hose 22 may be connected to the drain hole 21, and a drain valve 23 may be provided in the drain hose 22 to open and close the drain hose 22.

The rotating tub 30 may be rotatably provided inside the tub 20 and may accommodate laundry. The rotating tub 30 may be formed in a cylindrical shape with an open top surface. A through hole 33 may be formed on the side of the rotating tub 30 to allow washing water to flow in and out. A balancing unit 31 may be installed at an upper portion of the rotating tub 30 to eliminate load imbalance caused by laundry. The balancing unit 31 includes a housing having an annular channel, and a ball or a fluid mass provided to be movable inside the channel, and as the ball or fluid moves according to rotation of the rotating tub 30, load imbalance of the rotating tub 30 may be resolved.

The pulsator 40 may be rotatably provided on a lower portion of the rotating tub 30 to generate washing water current. Laundry may be washed by the washing water generated by the pulsator 40.

The washing machine 1 includes a water supply device 4 for supplying washing water into the tub 20. The water supply device 4 may include a water supply pipe connected to an external water supply source to guide washing water to the tub 20, and a water supply valve provided in the water supply pipe to regulate water supply.

The washing machine 1 may include a detergent supply device 5 for supplying detergent. Washing water supplied through the water supply device 4 is provided to pass through the detergent supply device 5 so that detergent may be supplied to the tub 20 together with the washing water.

The washing machine 1 includes a driving device for rotating the rotating tub 30 and the pulsator 40.

The driving device may include a motor 50 that converts electric force into a mechanical rotational force, and a shaft system that transmits the driving force of the motor 50 to the pulsator 40 and the rotating tub 30.

The motor 50 may include a stator 51 held stationary and a rotor 52 rotating by electromagnetically interacting with the stator 51.

The shaft system includes a dehydration shaft 59 provided to transmit the driving force of the motor 50 to the rotating tub 30, a washing shaft 58 provided to transmit the driving force of the motor 50 to the pulsator 40, and a clutch device 53 connecting or disconnecting the motor 50 to or from the dehydration shaft 59.

The dehydration shaft 59 may be formed to have a hollow, and the washing shaft 58 may be provided in the hollow of the dehydration shaft 59. The washing shaft 58 may be kept connected to the rotor 52 of the motor 50, and the dehydration shaft 59 may be connected to or disconnected from the rotor 52 of the motor 50 by the clutch device 53.

When the clutch device 53 disconnects the dehydration shaft 59 from the motor 50, power is transmitted only to the washing shaft 58 to rotate only the pulsator 40, and when the clutch device 53 connects the dehydration shaft 59 to the motor 50, power is transmitted both the dehydration shaft 59 and the washing shaft 58 to rotate the rotating tub 30 and the pulsator 40 at the same time.

When only the pulsator 40 is rotated, a washing water current is generated by the rotation of the pulsator 40, and the laundry is rotated by the generated washing water current to be brought into friction with the rotating tub 30, so that washing of the laundry is performed. When the pulsator 40 and the rotating tub 30 rotate at the same time, the laundry inside the rotating tub 30 is rotated and moisture of the laundry is separated by centrifugal force, so that the laundry is dehydrated.

The clutch device 53 includes an actuator 54 generating a driving force for power switching, a rod 55 linearly moving by the operation of the actuator 54, a lever 56 connected to the rod 55 to rotate, and a coupling 57 coupled to the dehydration shaft 59 to ascend and descend according to the operation of the lever 56. When the coupling 57 descends, the coupling 57 may be connected to the rotor 52 so that the driving force of the motor 50 may be transmitted to the dehydration shaft 59, and when the coupling 57 ascends, the coupling 57 may be separated from the rotor 52 so that the driving force of the motor 50 may not be transmitted to the dehydration shaft 59.

During the dehydration operation, the rotating tub 30 may rotate at a high speed, and in this case, the rotating tub 30 may perform a precession according to the weight imbalance of laundry contained in the rotating tub 30. The precession of the rotating tub 30 may cause vibration in the tub 20. The tub 20 may vibrate in the vertical and horizontal directions.

The above-described suspension device 6 may reduce the vibration in the vertical direction of the tub 20 by the suspension bar 8 formed elongated in the vertical direction and the spring 9 provided at the lower end of the suspension bar 7. However, the suspension device 6 may not effectively reduce the vibration of the tub 20 in the horizontal direction.

The washing machine according to the embodiment of the disclosure may include vibration reduction apparatuses (60 and 70 in FIG. 3) provided to reduce vibration of the tub 20. The vibration reduction apparatuses 60 and 70 may effectively reduce the vibration of the tub 20 in the horizontal direction. The vibration reduction apparatuses 60 and 70 may be installed between the cabinet 11 and the tub 20.

Since the vibration reduction apparatuses 60 and 70 are installed irrespective of the suspension device 6 as such, no force is applied to the suspension device 6 and deformation of the suspension device 6 may be prevented. A guide bar mount 15 is provided on the cabinet 70 to install the vibration reduction apparatuses 60 and 70, and a support pin mount 24 is provided on the tub 20 to install the vibration reduction apparatuses 60 and 70.

Hereinafter, the vibration reduction apparatuses 60 and 70 of the disclosure will be described in detail.

Figure 3:
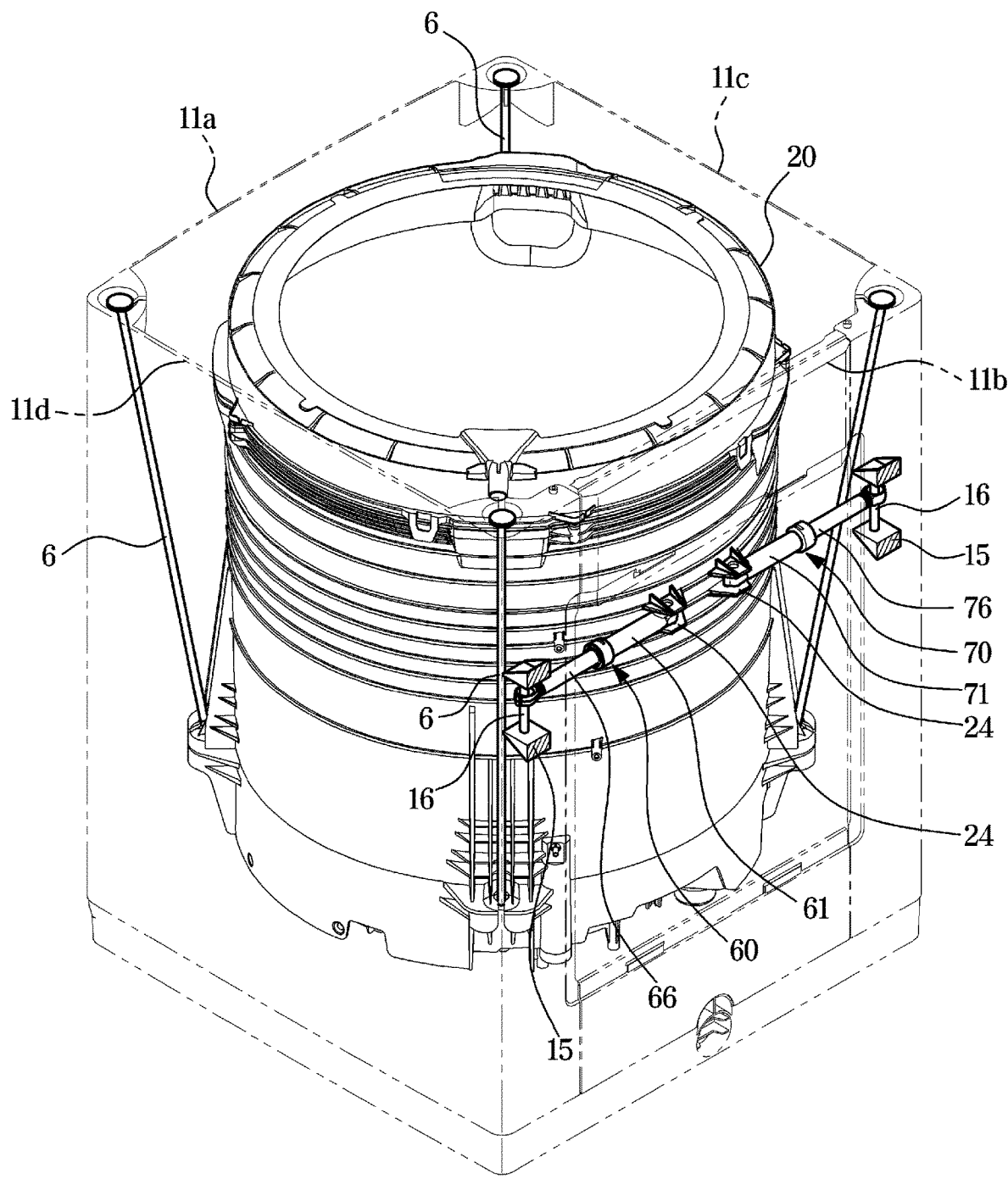
FIG. 3 is a perspective view schematically illustrating main parts of the washing machine of FIG. 1.
Figure 4:
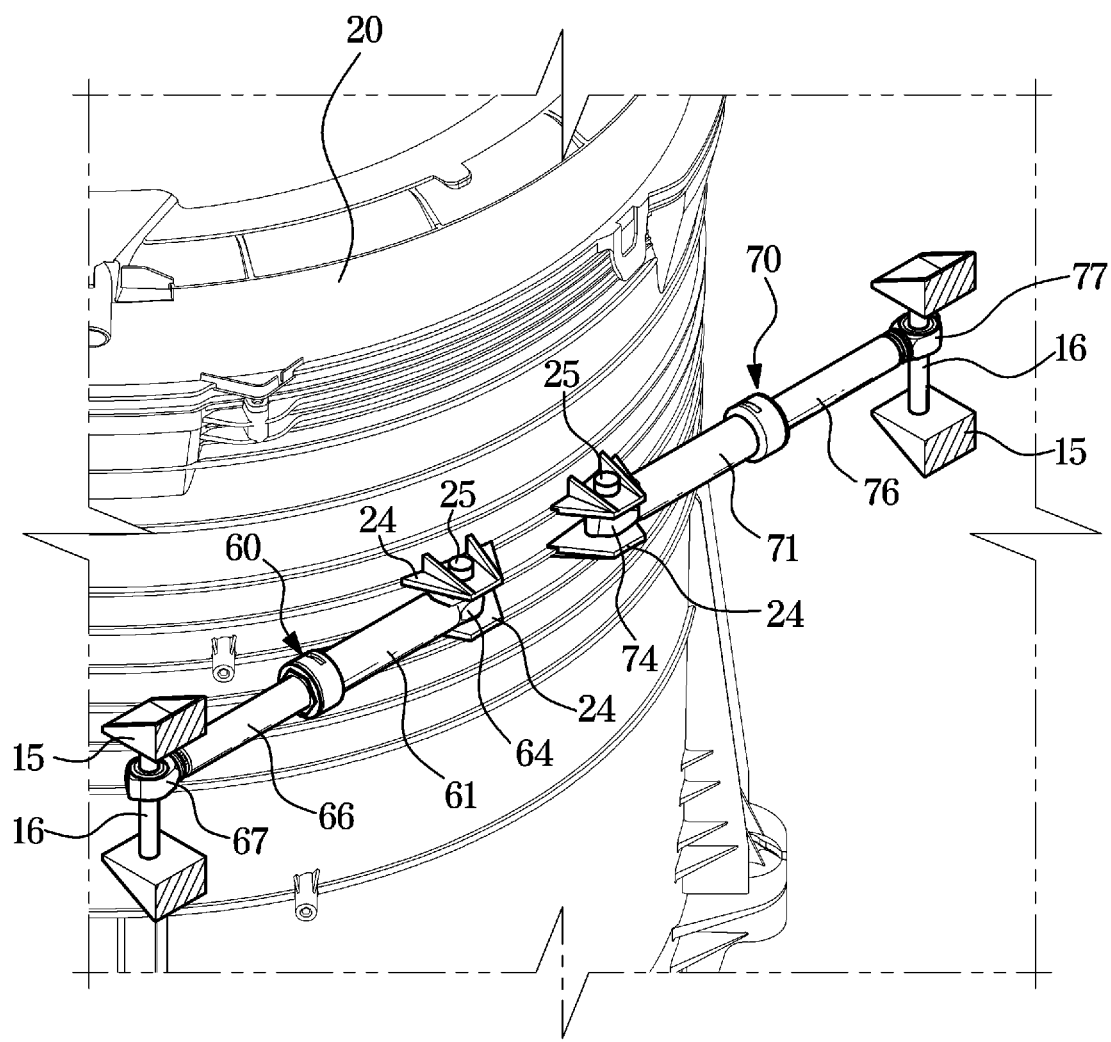
FIG. 4 is a perspective view illustrating a vibration reduction apparatus installed between a cabinet and a tub of the washing machine of FIG. 1.
Figure 5:
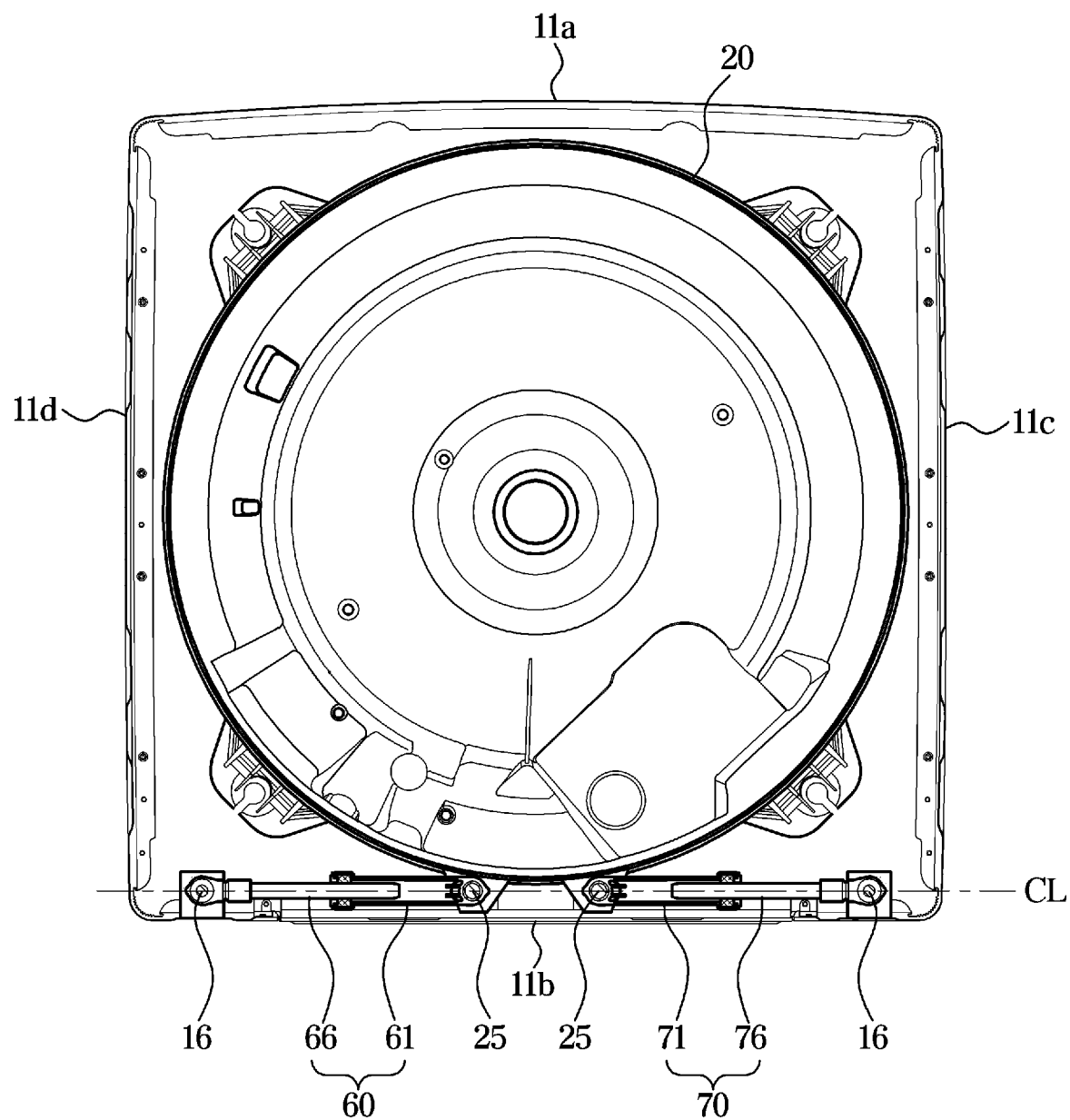
FIG. 5 is a plan cross-sectional view illustrating the vibration reduction apparatus installed between the cabinet and the tub of the washing machine of FIG. 1.
Figure 6:
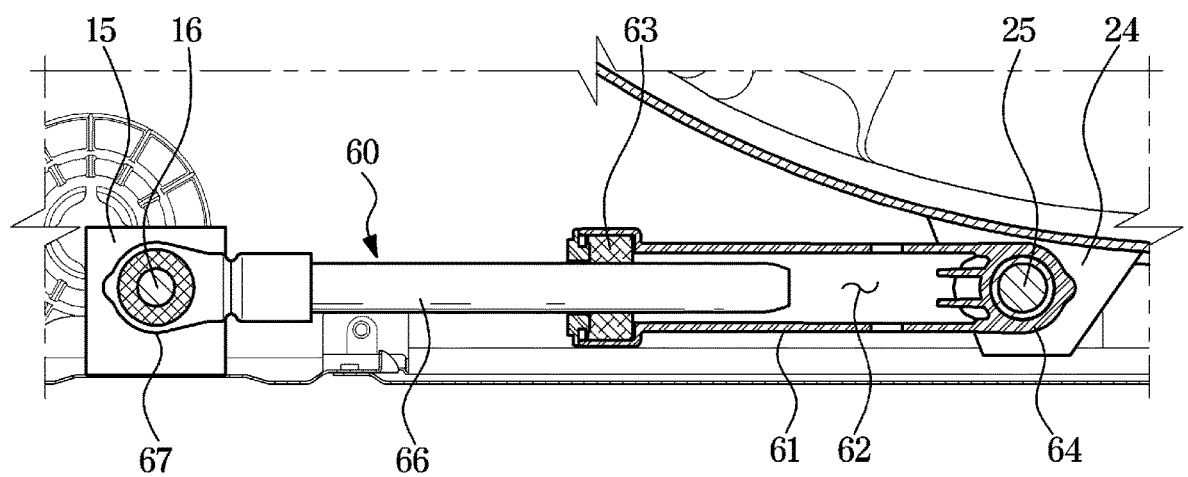
FIG. 6 is an enlarged plan cross-sectional view illustrating the vibration reduction apparatus of the washing machine of FIG. 1.
Figure 7:
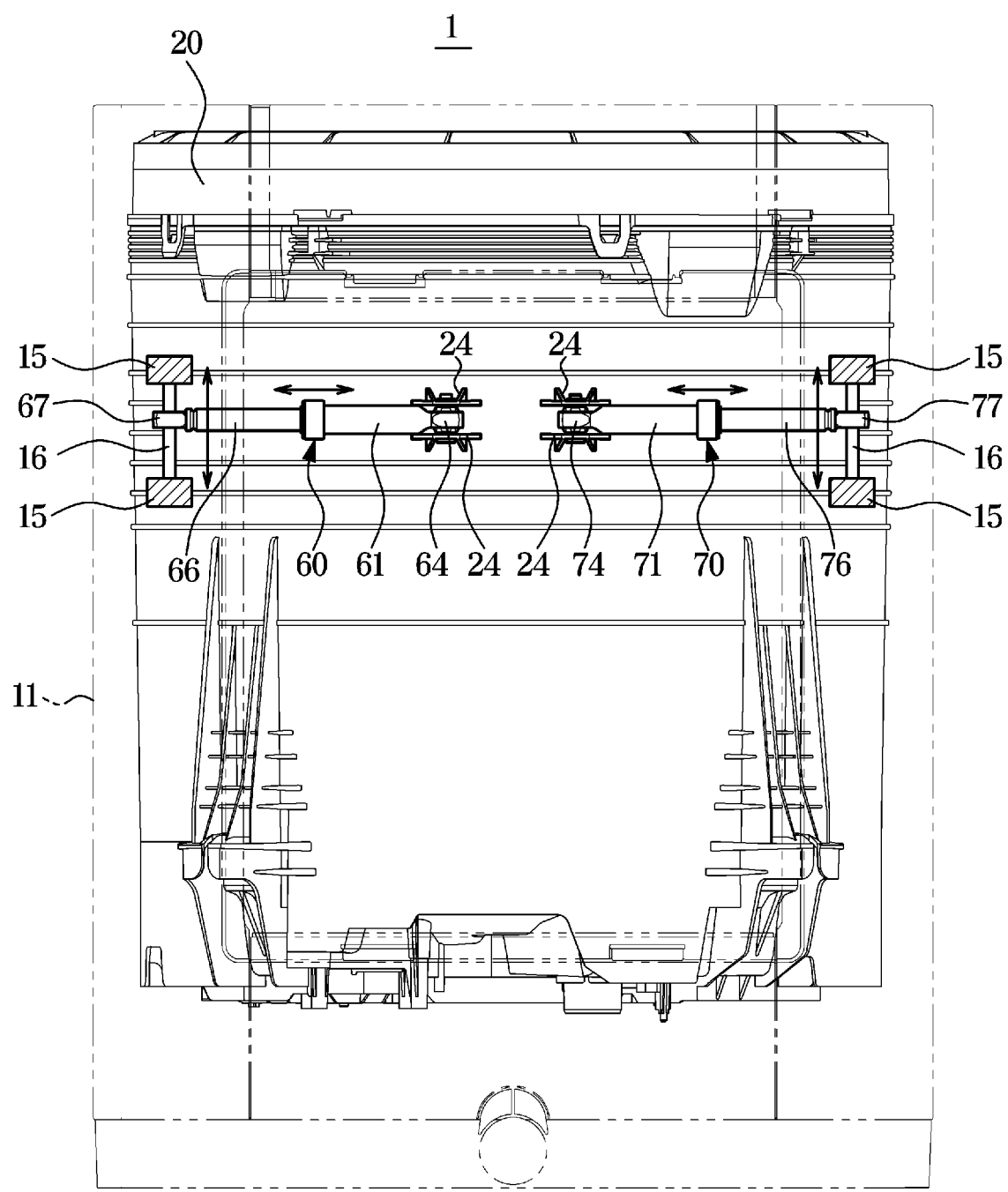
FIG. 7 is a view illustrating an operation of the vibration reduction apparatus of the washing machine of FIG. 1.

FIG. 3 is a perspective view schematically illustrating main parts of the washing machine of FIG. 1. FIG. 4 is a perspective view illustrating a vibration reduction apparatus installed between a cabinet and a tub of the washing machine of FIG. 1. FIG. 5 is a plan cross-sectional view illustrating the vibration reduction apparatus installed between the cabinet and the tub of the washing machine of FIG. 1. FIG. 6 is an enlarged plan cross-sectional view illustrating the vibration reduction apparatus of the washing machine of FIG. 1. FIG. 7 is a view illustrating an operation of the vibration reduction apparatus of the washing machine of FIG. 1.

Referring to FIGS. 3 to 7, the vibration reduction apparatus 60 and 70 may include a first vibration reduction apparatus 60 and a second vibration reduction apparatus 70. The structures of the first vibration reduction apparatus 60 and the second vibration reduction apparatus 70 may be the same.

The first vibration reduction apparatus 60 and the second vibration reduction apparatus 70 may be provided to be extended and contracted along the length direction thereof. The first vibration reduction apparatus 60 and the second vibration reduction apparatus 70 may damp vibration by extending and contracting operations.

The first vibration reduction apparatus 60 and the second vibration reduction apparatus 70 may be installed to be parallel with a bottom plate 12e of the cabinet 11. The first vibration reduction apparatus 60 and the second vibration reduction apparatus 70 may be disposed such that the longitudinal central axis of the first vibration reduction apparatus 60 and the longitudinal central axis of the second vibration reduction apparatus 70 are in alignment with each other on the same line (CL in FIG. 5).

Since the suspension device 6 is connected to the lower part of the tub 20, the first vibration reduction apparatus 60 and the second vibration reduction apparatus 70 may be connected to the upper part of the tub 20 to balance the upper and lower parts of the tub 20.

The first vibration reduction apparatus 60 and the second vibration reduction apparatus 70 may be installed between the tub 20 and the rear plate 11b of the cabinet 11 so as to be parallel with the rear plate 11b of the cabinet 11.

With such a structure, the vibration of the tub 20 may be efficiently and uniformly reduced with a minimum number of the vibration reduction apparatuses 60 and 70.

However, unlike the embodiment, the first vibration reduction apparatus 60 and the second vibration reduction apparatus 70 may be installed between the tub 20 and the front plate 11a of the cabinet 20 to be in parallel with the front plate 11a of the cabinet 11.

Alternatively, the first vibration reduction apparatus 60 and the second vibration reduction apparatus 70 may be installed between the tub 20 and the left side plate 11c of the cabinet 11 to be in parallel with the left side plate 11c of the cabinet 11.

Alternatively, the first vibration reduction apparatus 60 and the second vibration reduction apparatus 70 may be installed between the tub 20 and the right-side plate 11d of the cabinet 11 to be in parallel with the right-side plate 11d of the cabinet 11.

The cabinet 11 may include a guide bar mount 15 protruding from the rear plate 11b of the cabinet 11 and a guide bar 16 supported by the guide bar mount 15 to install the vibration reduction apparatuses 60 and 70. The guide bar 16 may be formed to be elongated in the vertical direction, and may guide the vibration reduction apparatuses 60 and 70 to move in the vertical direction along the guide bar 16.

The tub 20 may include a support pin mount 24 protruding from the tub 20 and a support pin 25 supported on the support pin mount 24 to install the vibration reduction apparatuses 60 and 70. The support pin mount 24 may restrict the vibration reduction apparatuses 60 and 70 from moving in the vertical direction with respect to the support pin mount 24.

The first vibration reduction apparatus 60 may include a cylinder 61 having an inner space 62 and a piston 66 provided in the inner space 62 of the cylinder 61 to advance and retreat.

The cylinder 61 may be provided with a connecting ring 64 and may be connected to the tub 20 in such a manner that the support pin 25 of the tub 20 is inserted into the connecting ring 64. The connecting ring 64 of the cylinder 61 may be configured to come in close contact between a pair of support pin mounts 24 to restrict the connecting ring 64 of the cylinder 61 from moving in the vertical direction with respect to the support pin 25. Accordingly, the first vibration reduction apparatus 60 may perform a rotational movement on the support pin 25 while being restricted form performing the vertical movement or horizontal movement with respect to the support pin 25.

The piston 66 may be provided with a connecting ring 67 and may be connected to the cabinet 11 in a such manner that the guide bar 16 of the cabinet 11 is inserted into the connecting ring 67. The connecting ring 67 of the piston 66 may move up and down in a predetermined range along the guide bar 16. Therefore, the first vibration reduction apparatus 60 may perform rotational motion and an upward and downward motion with respect to the guide bar 16 while being restricted from performing horizontal motion with respect to the guide bar 16.

Friction between the piston 66 and the cylinder 61 generated while the piston 66 advances and retracts in the inner space 62 of the cylinder 61 may damp vibration of the tub 20. However, a friction member 63 may be provided in the inner space 62 of the cylinder 61 to increase the frictional force. The friction member 63 may be formed of polyurethane or rubber.

Referring to FIG. 7, the operation of the vibration reduction apparatuses 60 and 70 will be described in brief.

When vibration occurs in the tub 20 according to rotation of the rotating tub 30, the pistons 66 and 76 of the vibration reduction apparatuses 60 and 70 may advance and retract in the cylinders 61 and 71. The frictional force generated during the advance and retracting of the pistons 66 and 76 may reduce the vibration of the tub 20.

When the tub 20 moves in the vertical direction, the vibration reduction apparatuses 60 and 70 may move together in the vertical direction along the guide bar 16, and so that the vibration reduction apparatuses 60 and 70 may be maintained in a horizontal state and efficiently reduce the horizontal vibration of the tub 20.

Figure 8:
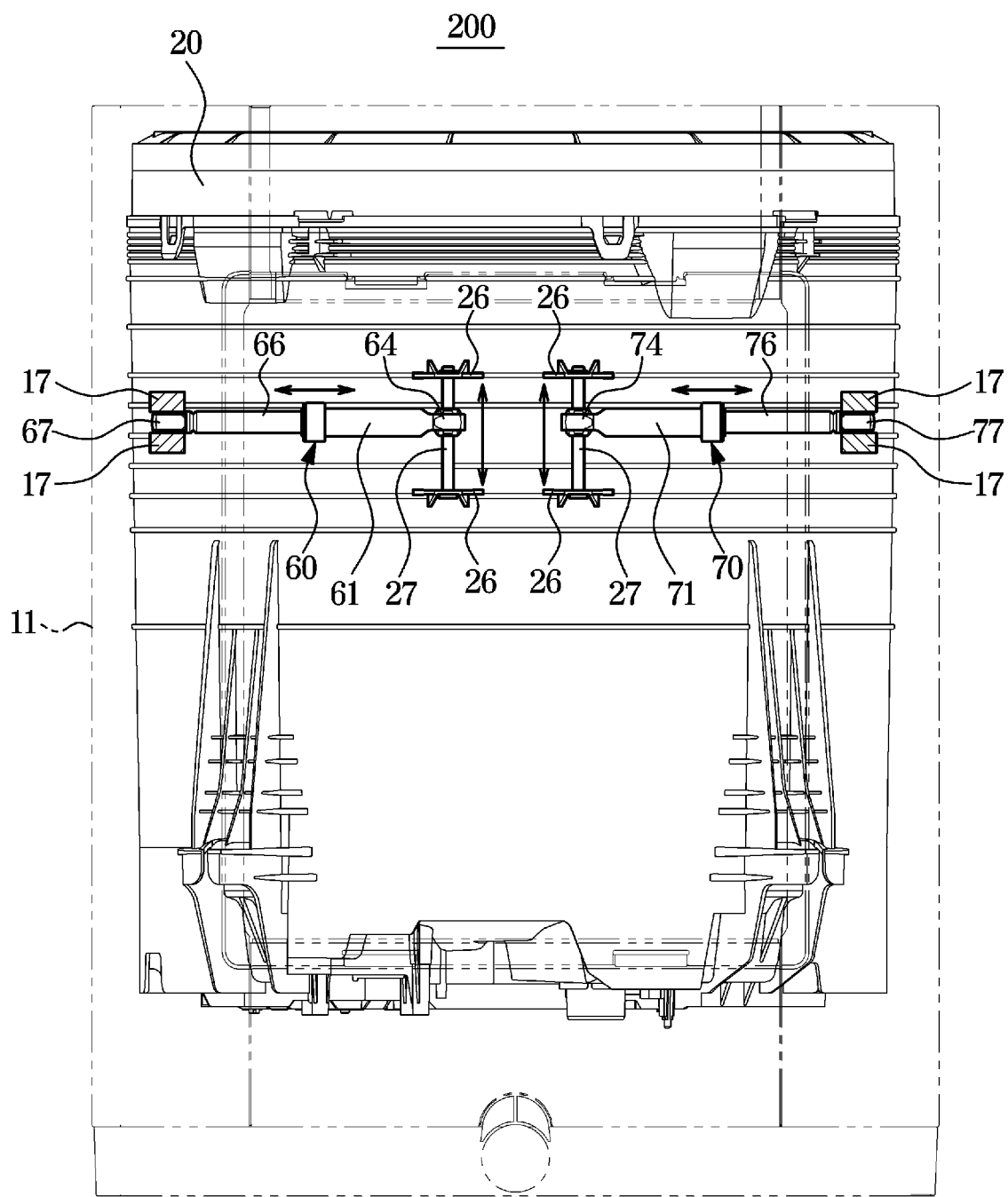
FIG. 8 is a view illustrating an operation of a vibration reduction apparatus of a washing machine according to another embodiment of the disclosure.

FIG. 8 is a view illustrating an operation of a vibration reduction apparatus of a washing machine according to another embodiment of the disclosure.

The same reference numerals are assigned to the same configurations as those in the above-described embodiment, and detailed description thereof may be omitted.

Unlike the above-described embodiment, a guide bar 27 and a guide bar mount 26 may be provided on the tub 20, and a support pin and a support pin mount 17 may be provided on the cabinet 11.

Therefore, the cylinder connecting rings 64 and 74 of the vibration reduction apparatuses 60 and 70 may be connected to the guide bars 27, and the piston connecting rings 67 and 77 of the vibration reduction apparatuses 60 and 70 may be connected to the support pins.

Figure 9:
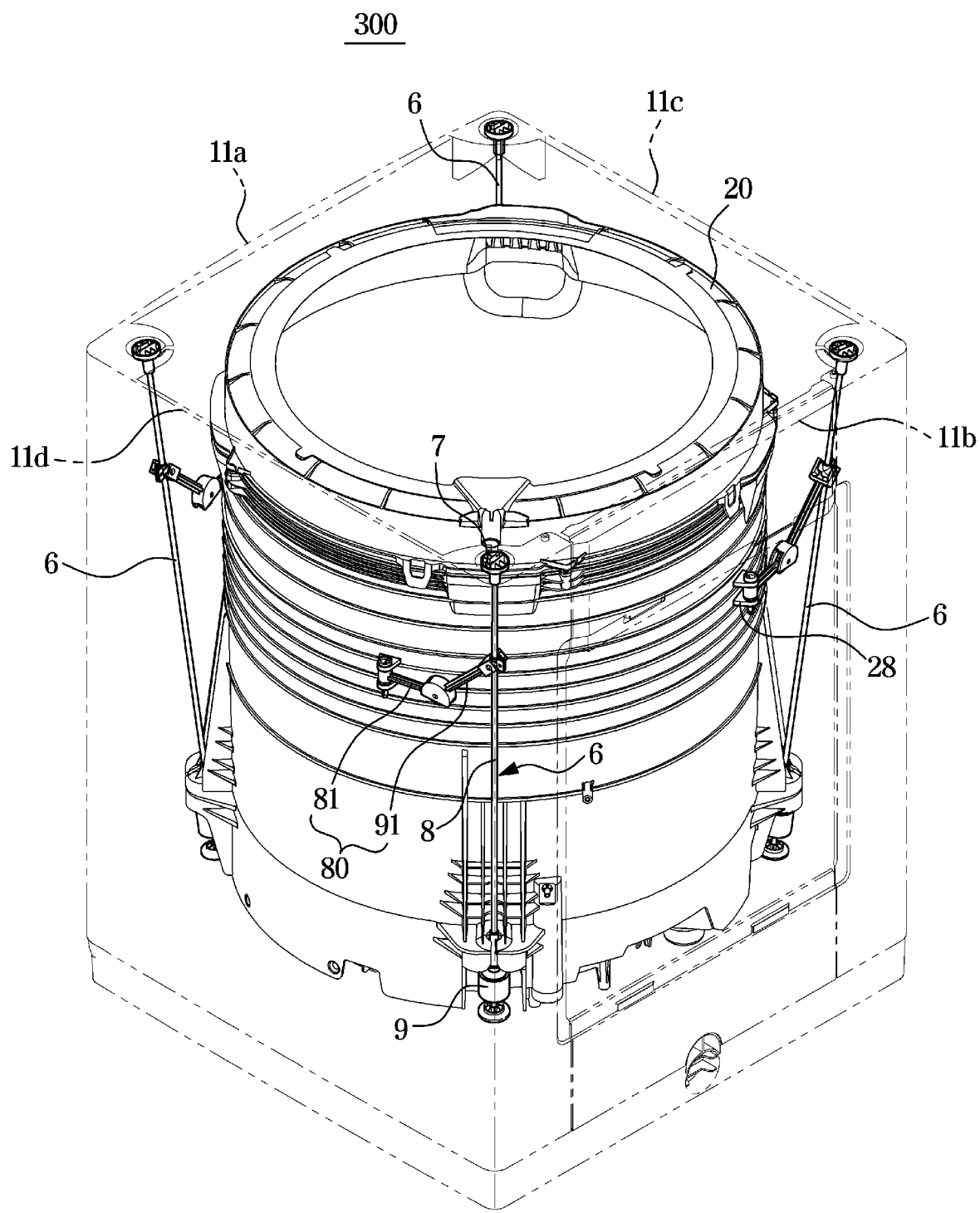
FIG. 9 is a perspective view schematically illustrating main parts of a washing machine according to still another embodiment of the disclosure.
Figure 10:
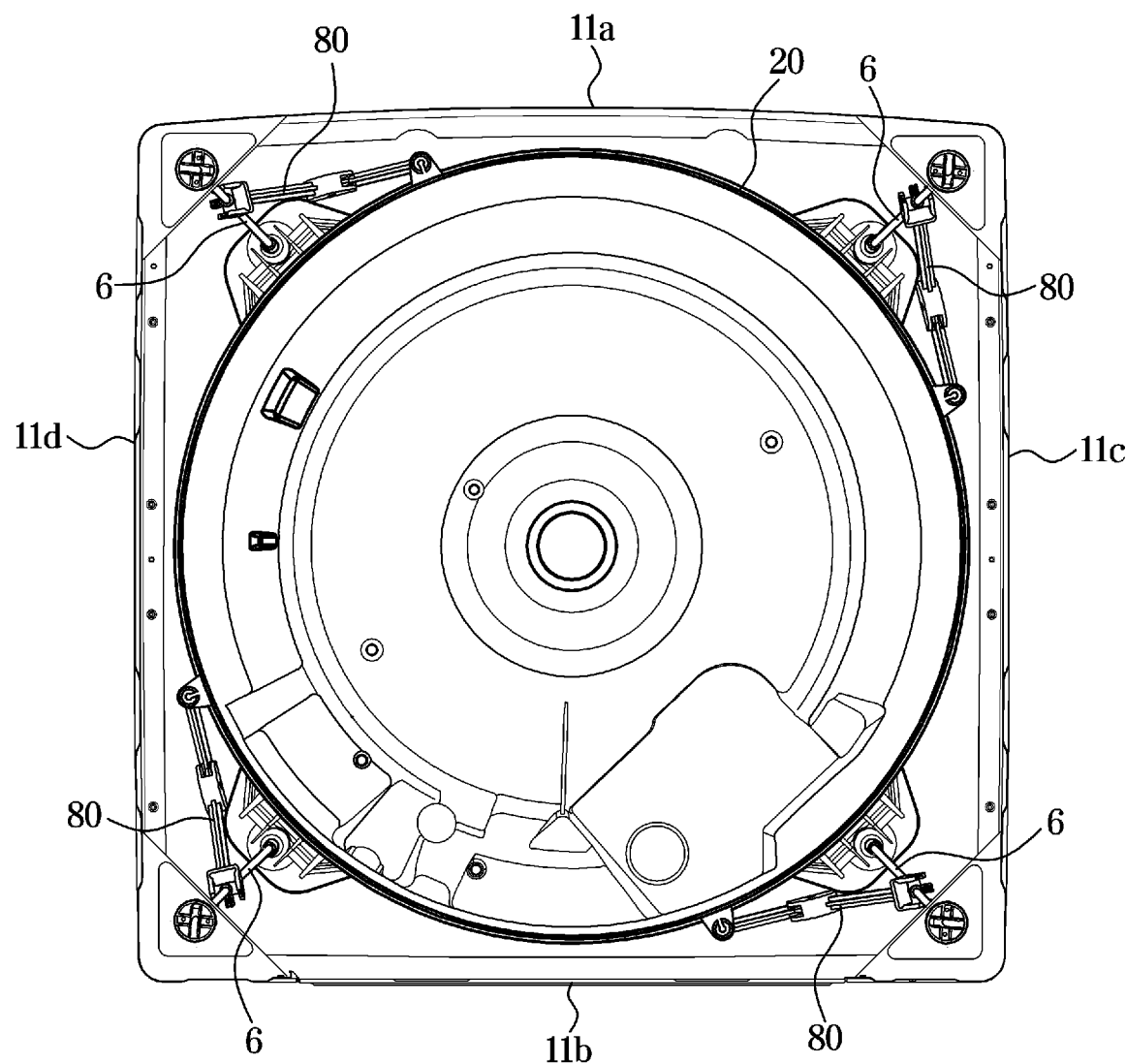
FIG. 10 is a plan cross-sectional view illustrating a vibration reduction apparatus installed between the cabinet and the tub of the washing machine of FIG. 9.
Figure 11:
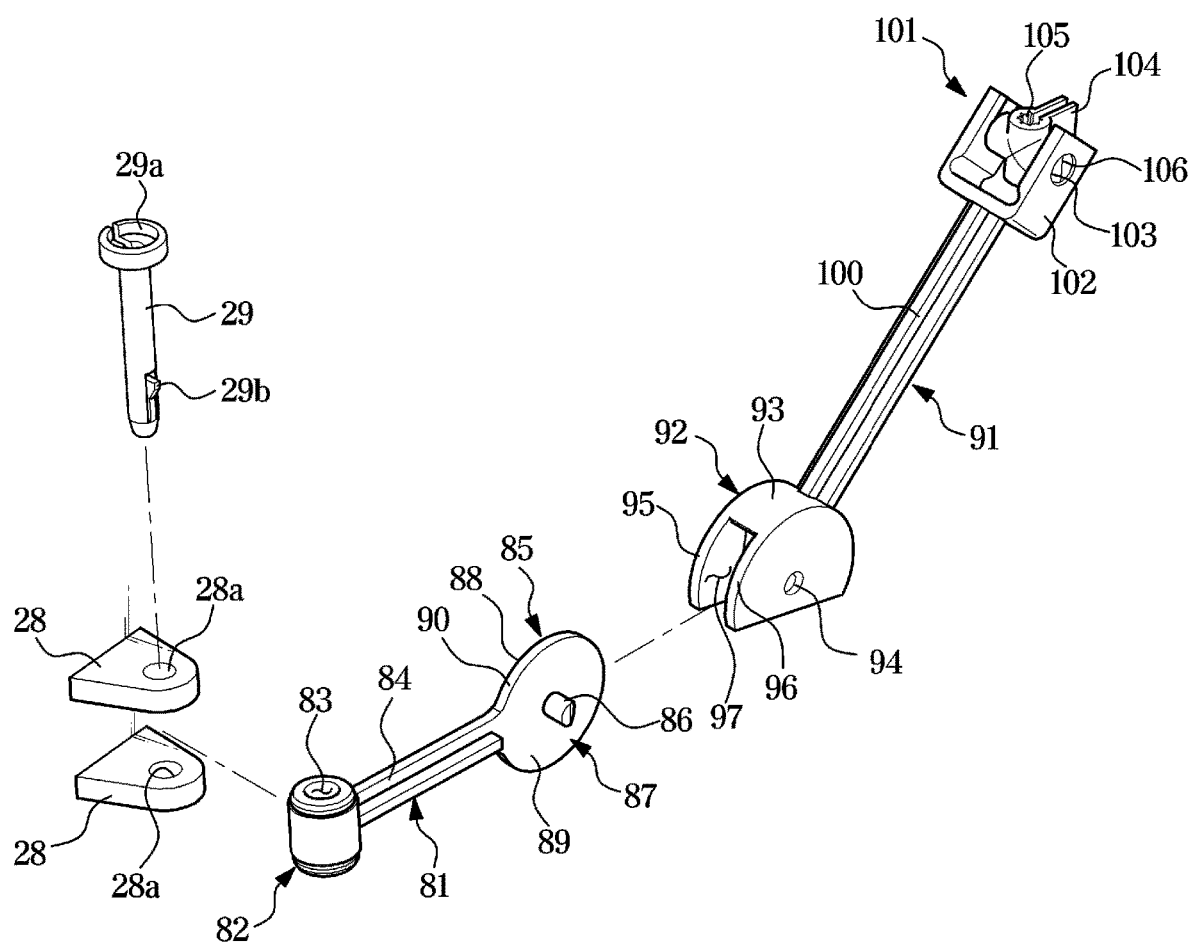
FIG. 11 is an exploded view illustrating the vibration reduction apparatus of the washing machine shown in FIG. 9.
Figure 12:
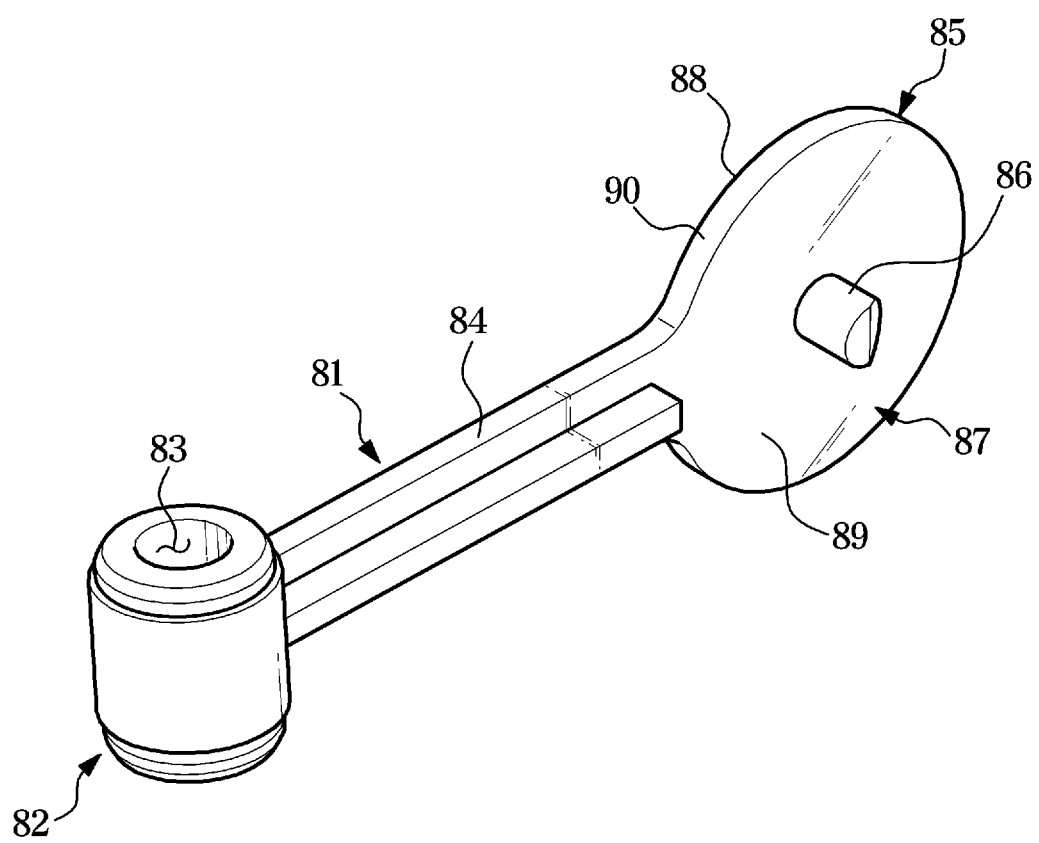
FIG. 12 is a view illustrating a first rod of the vibration reduction apparatus of the washing machine shown in FIG. 9.
Figure 13:
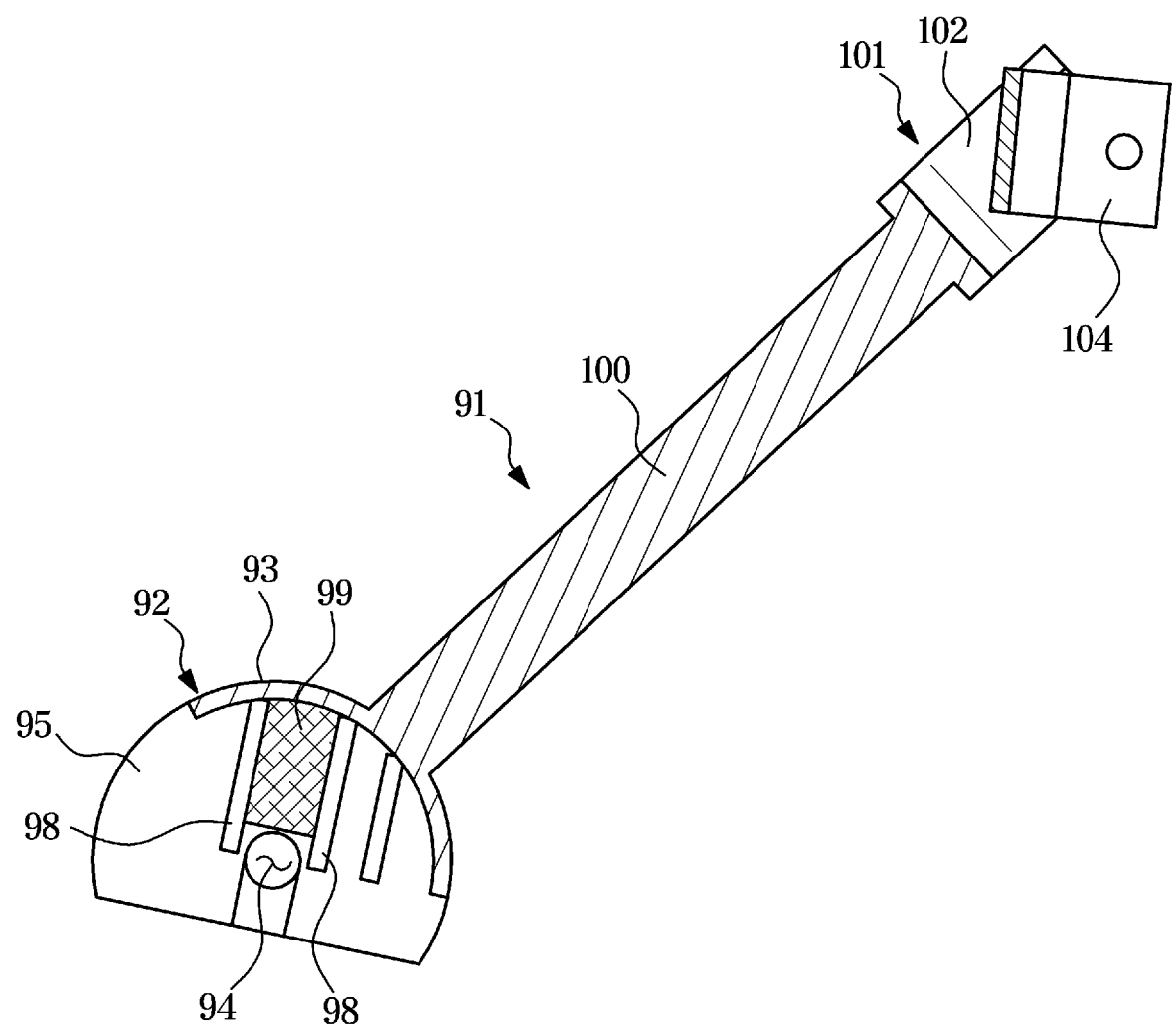
FIG. 13 is a view illustrating a second rod of the vibration reduction apparatus of the washing machine shown in FIG. 9.
Figure 14:
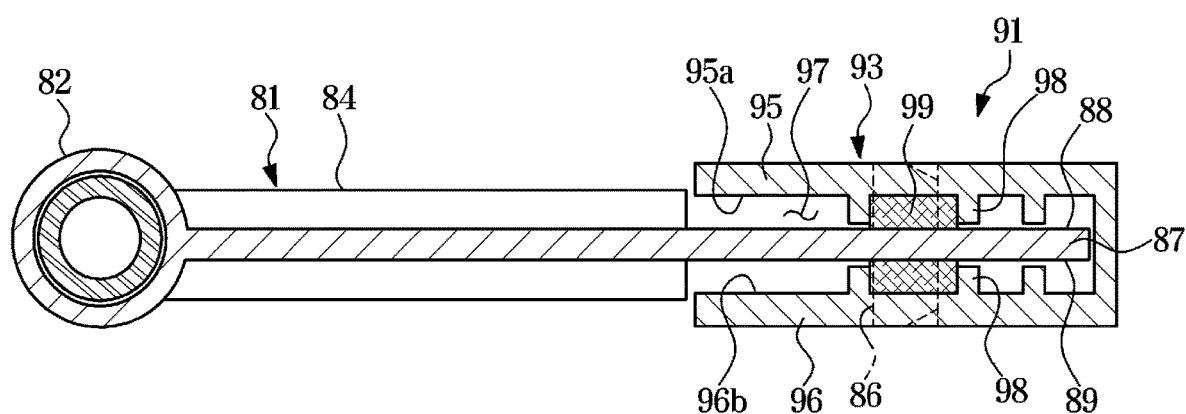
FIG. 14 is a view illustrating a coupling state of the first rod and the second rod of the vibration reduction apparatus of the washing machine shown in FIG. 9.
Figure 15:
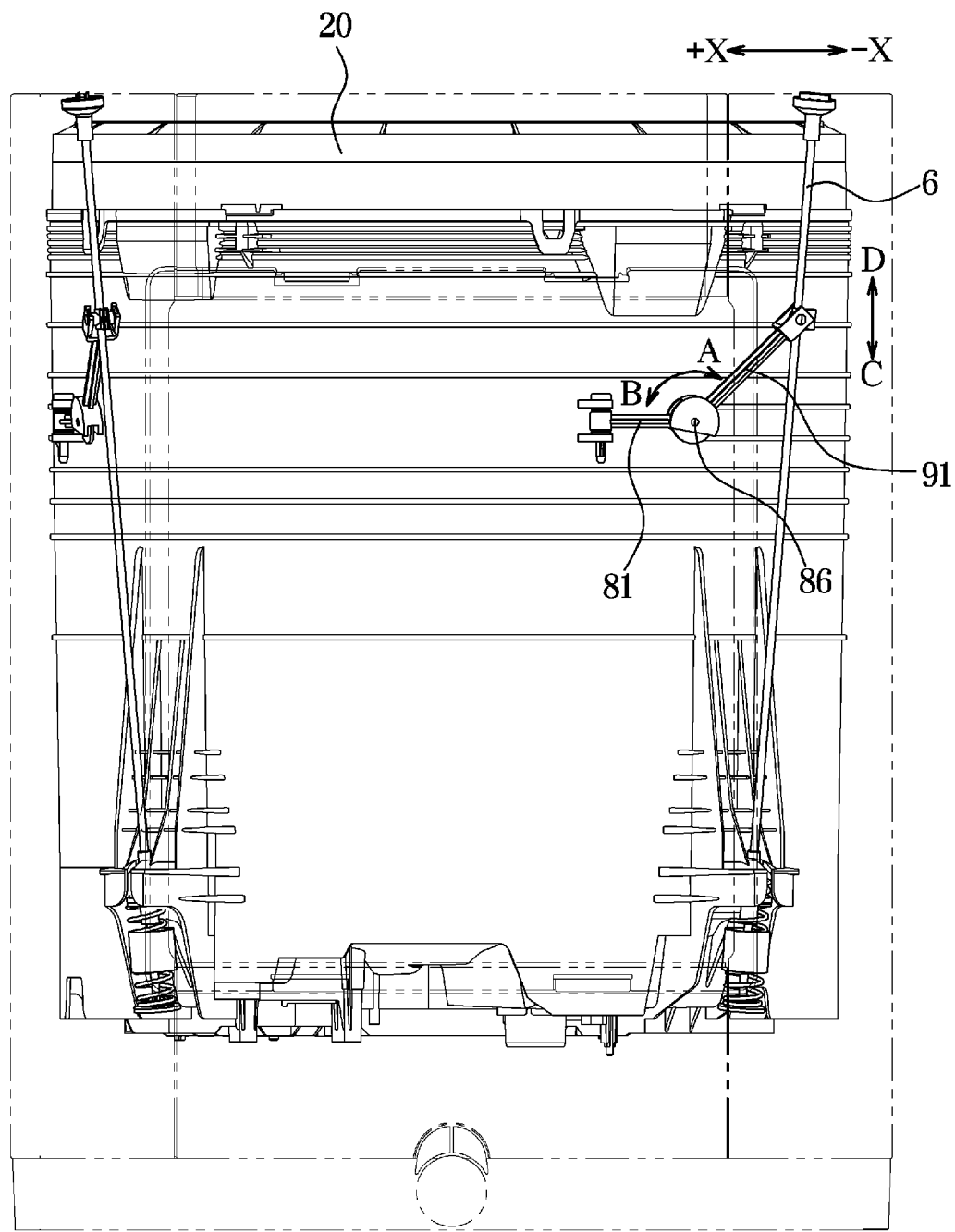
FIG. 15 is a view illustrating an operation of the vibration reduction apparatus of the washing machine shown in FIG. 9.

FIG. 9 is a perspective view schematically illustrating main parts of a washing machine according to still another embodiment of the disclosure. FIG. 10 is a plan cross-sectional view illustrating a vibration reduction apparatus installed between the cabinet and the tub of the washing machine of FIG. 9. FIG. 11 is an exploded view illustrating the vibration reduction apparatus of the washing machine shown in FIG. 9. FIG. 12 is a view illustrating a first rod of the vibration reduction apparatus of the washing machine shown in FIG. 9. FIG. 13 is a view illustrating a second rod of the vibration reduction apparatus of the washing machine shown in FIG. 9. FIG. 14 is a view illustrating a coupling state of the first rod and the second rod of the vibration reduction apparatus of the washing machine shown in FIG. 9. FIG. 15 is a view illustrating an operation of the vibration reduction apparatus of the washing machine shown in FIG. 9.

Referring to FIGS. 9 to 15, a washing machine and a vibration reduction apparatus provided therein according to still another embodiment of the disclosure will be described. The same reference numerals are assigned to the same configurations as those in the above-described embodiment, and detailed description thereof may be omitted.

A washing machine 300 includes a cabinet 11 forming the external appearance, a tub 20 disposed inside the cabinet 11, a rotating tub 30 rotatably disposed inside the tub 20, a suspension device 6 connecting the tub 20 to the cabinet 11 so that the tub 20 is supported by the cabinet 11, and a vibration reduction apparatus 80 installed between the tub 20 and the suspension device 6 to reduce vibration of the tub 20 according to rotation of the rotating tub 30.

The suspension device 6 is installed at each of the four corners of the cabinet 11, and the vibration reduction apparatus 80 may be connected to each of the suspension devices 6.

The vibration reduction apparatus 80 may include a first rod 81 and a second rod 91 that are rotatably coupled to each other.

The first rod 81 may include a tub connection portion 82 connected to the tub 20, a first hinge portion 85 rotatably coupled to the second rod 91, and a first rod body 84 connecting the tub connection portion 82 to the first hinge portion 85.

The tub connection portion 82 may have an insertion hole 83 and may be coupled to the tub 20 in such a manner that a shaft 29 provided in the tub 20 is inserted into the insertion hole 83. A shaft mount 28 may protrude from the tub 20, and may be provided with an insertion hole 28a into which the shaft 29 is inserted. The shaft 29 may include a head portion 29a formed at an end of the shaft 29 and a locking protrusion 29b protruding from the outer circumferential surface of the shaft 29 so as to be fixed in a state inserted into the insertion hole 28a. The first rod 81 may be rotatable about the shaft 29.

The first hinge portion 85 may include a disk 87 and a hinge pin 86 protruding from the disk 87.

The disk 87 may be formed in a cylindrical shape having an upper surface 88, a lower surface 89, and a circumferential surface 90. The hinge pin 86 may be formed to protrude from the centers of the upper surface 88 and the lower surface 89.

The second rod 91 includes a second hinge portion 92 rotatably coupled to the first hinge portion 85 of the first rod 81, a suspension device connection portion 101 provided to be connected to the suspension device 6, and a second rod body 100 connecting the second hinge portion 92 to the suspension device connection portion 101.

The second hinge portion 92 may include a disk housing 93 into which the disk 87 is inserted. The disk housing 93 may include a first wall 95, a second wall 96, and a slot 97 formed between the first wall 95 and the second wall 96 so that the disk 87 is inserted into the slot 97. A hinge pin insertion hole 94 into which the hinge pin 86 is inserted may be formed in the first wall 95 and the second wall 96.

A friction member 99 may be provided inside the disk housing 93 to generate a friction force by coming in friction with the disk 87 when the first hinge portion 85 and the second hinge portion 92 rotate. The friction member 99 may be formed of polyurethane or rubber.

A mounting rib 98 protruding to mount the friction member 99 may protrude on at least one of an inner surface 95a of the first wall 95 and an inner surface 96a of the second wall 96 of the disk housing 93. The friction member 99 may be fitted between the mounting ribs 98 and coupled.

However, unlike the embodiment, the friction member 99 may be omitted. Instead of the friction member 99, the inner surface 95a of the first wall 95 of the disk housing 93 may be provided to come in close contact with the upper surface 88 of the disk 87, and the inner surface 96a of the second wall 96 may be provided to come in close contact with the lower surface 89 of the disk 87, so that the disk housing 93 and the disk 87 may directly come in friction with each other.

The suspension device connection portion 101 may include a holder 104 having a connection groove 105 into which the suspension bar 7 is inserted, and a bracket 102 to which the holder 104 is rotatably coupled. The holder 104 includes a rotation pin 106 so that the holder 104 is rotatably coupled to the bracket 102, and a pin receiving portion 103 in which the rotation pin 106 is accommodated may be formed in the bracket 102.

With such a configuration, the suspension device connection portion 101 may move in the vertical direction along the suspension bar 7.

Referring to FIG. 15, the operation of the vibration reduction apparatus 80 will be described in brief.

When vibration occurs in the tub 20 according to rotation of the rotating tub 30, the suspension device connection portion 101 of the second rod 91 moves in the vertical direction along the suspension bar 7 and the second rod 91 may rotate around the hinge pin 86.

The frictional force generated between the disk 87 and the friction member 99 during rotation of the second rod 91 may reduce vibration of the tub 20.

For example, when displacement occurs in +X direction in the tub 20, the suspension device connection portion 101 may descend in direction C, and the second rod 91 may rotate in direction A in which the angle between the second rod 91 and the first rod 81 increases. As the second rod 91 rotates, a friction force is generated between the disk 87 and the friction member 99, so that the displacement of the tub 20 may be reduced.

When displacement occurs in −X direction in the tub 20, the suspension device connection portion 101 may ascend in direction D, and the second rod 91 may rotate in direction B where the angle between the second rod 91 and the first rod 81 decreases. As the second rod 91 rotates, a friction force is generated between the disk 87 and the friction member 99, so that the displacement of the tub 20 may be reduced.

As such, the vibration reduction apparatus 80 damps the horizontal vibration of the tub 20 through rotational motion of the first rod 81 and the second rod 91, thereby efficiently reducing the vibration without applying an excessive force to the suspension device 6.

Figure 16:
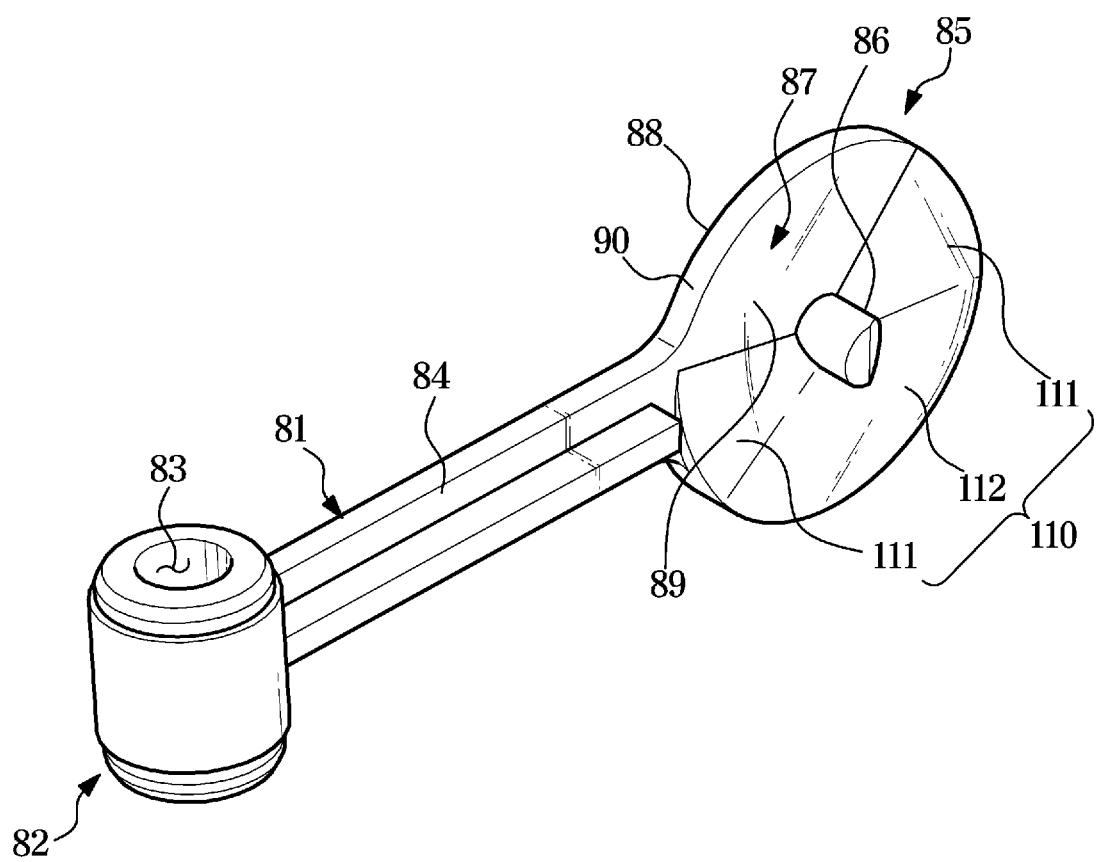
FIG. 16 is a view illustrating a first rod according to another embodiment of the disclosure.
Figure 17:
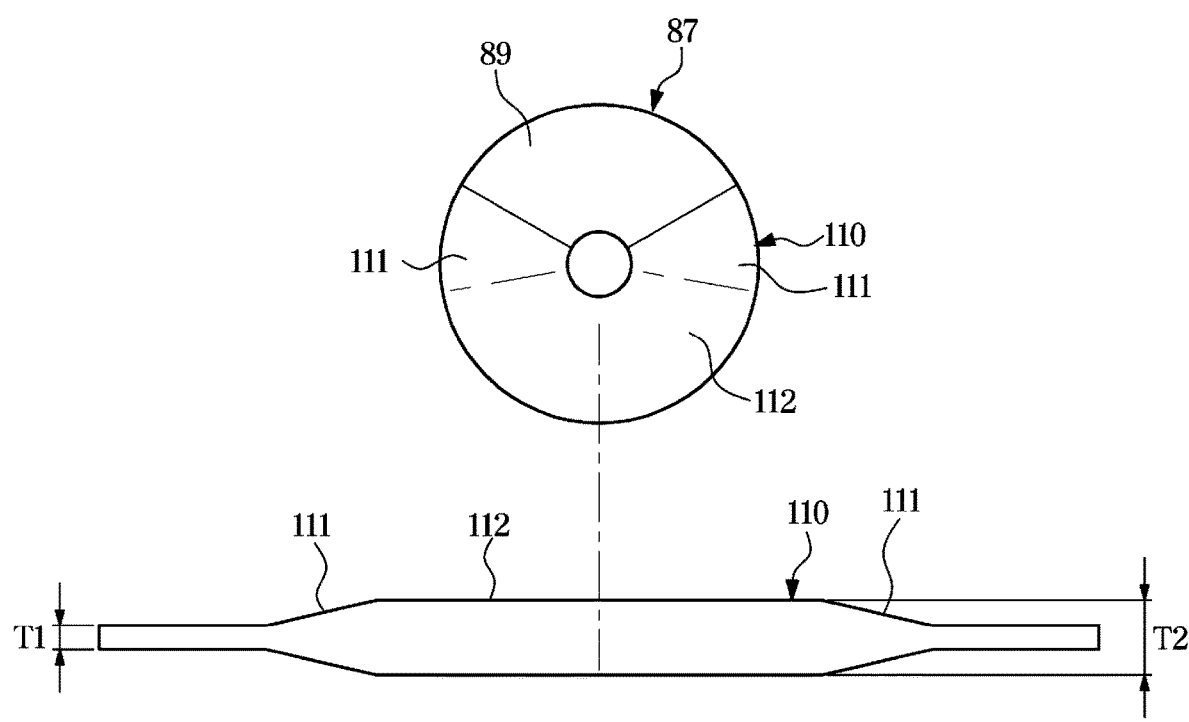
FIG. 17 is a plan view and a side exploded view illustrating a disk of the first rod shown in FIG. 16.
Figure 18:
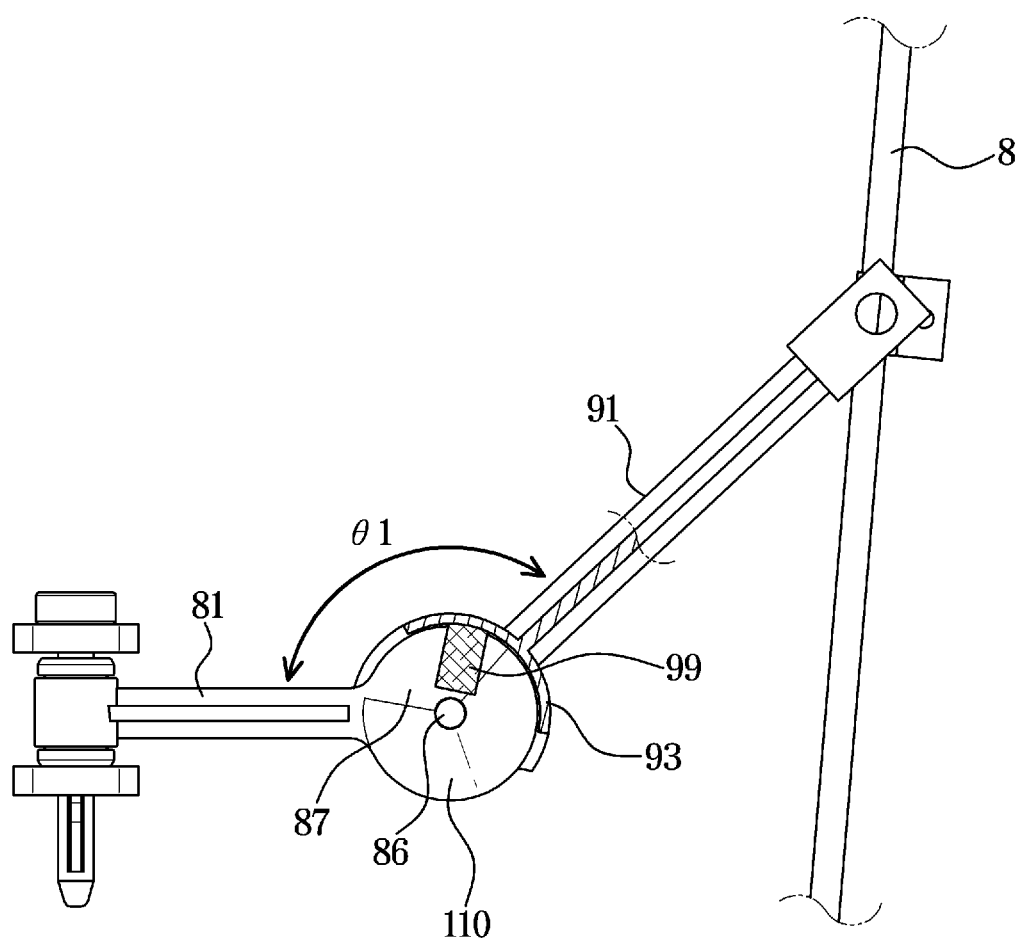
FIG. 18 is a view illustrating a first state of a vibration reduction apparatus having the first rod shown in FIG. 16.
Figure 19:
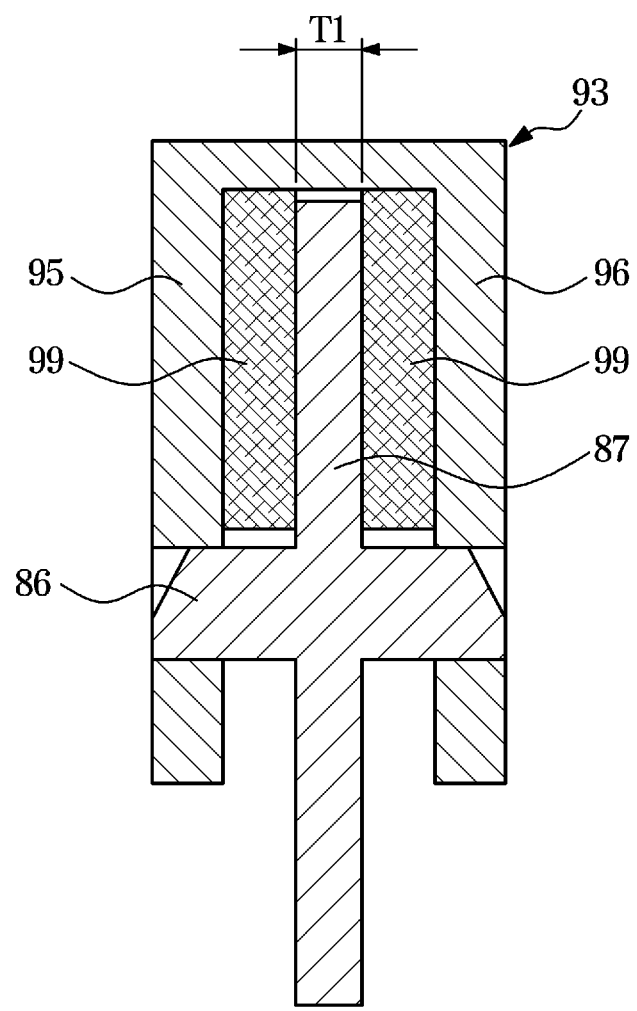
FIG. 19 is a cross-sectional view illustrating the vibration reduction apparatus in a state shown in FIG. 18.
Figure 20:
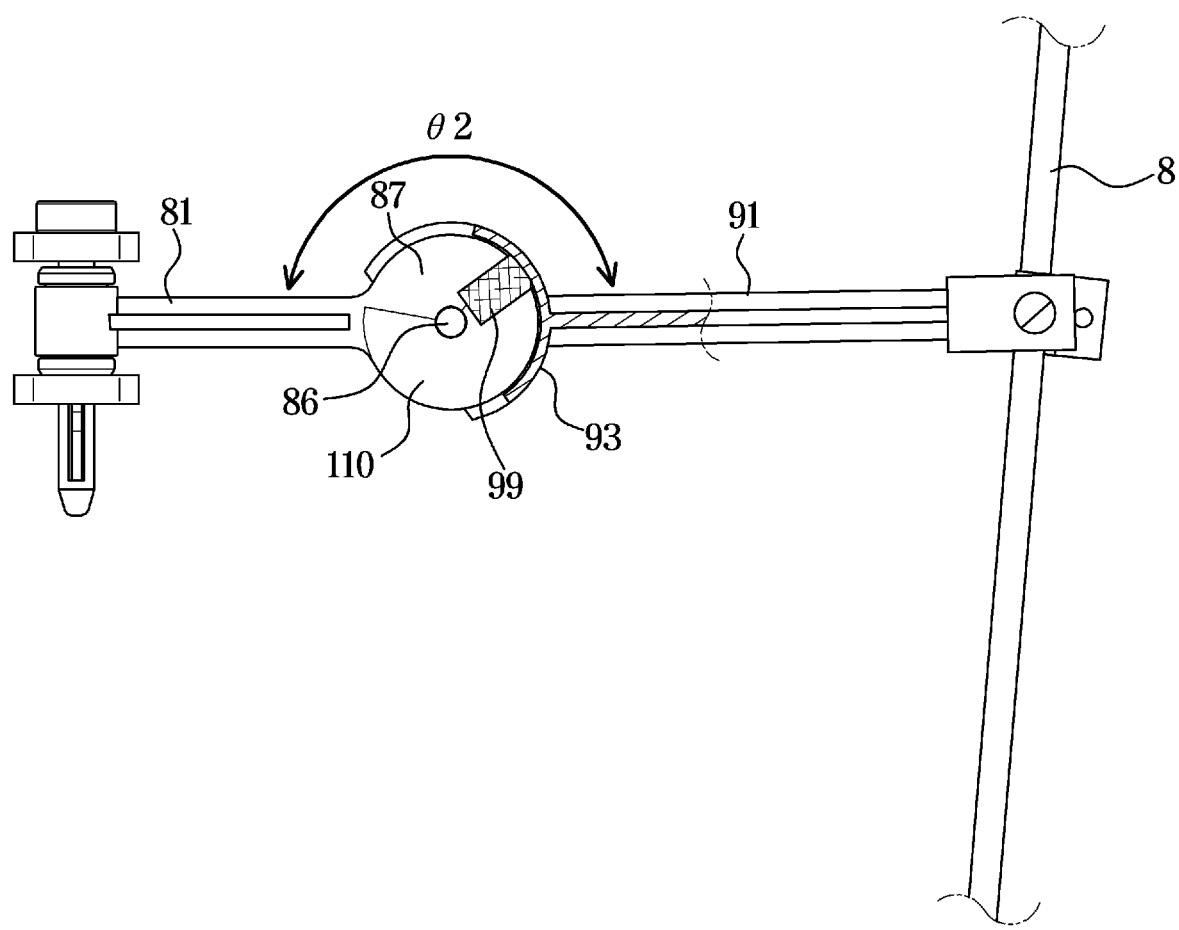
FIG. 20 is a view illustrating a second state of the vibration reduction apparatus having the first rod shown in FIG. 16.
Figure 21:
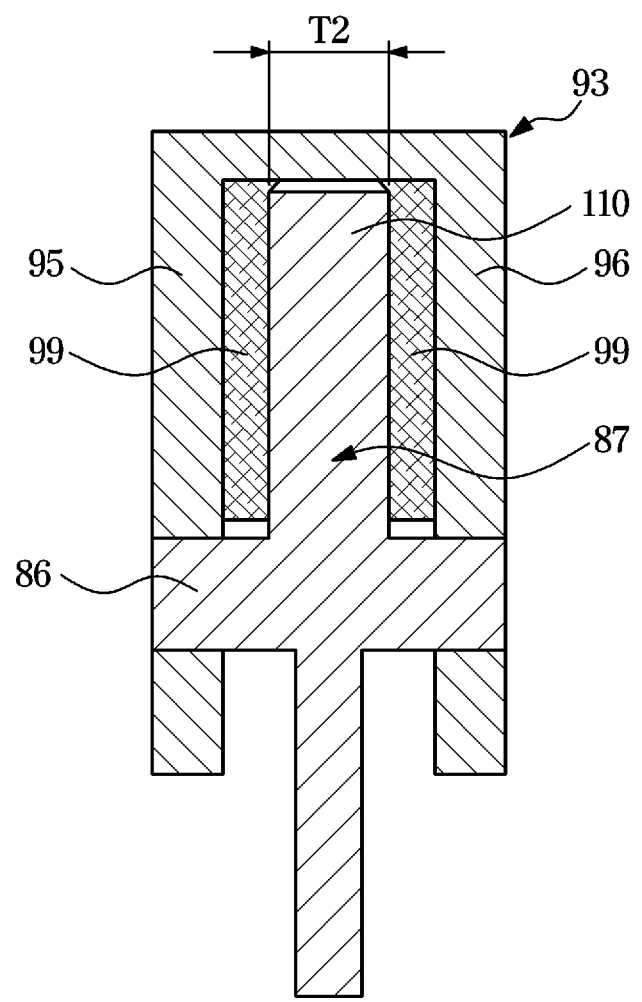
FIG. 21 is a cross-sectional view illustrating the vibration reduction apparatus in a state shown in FIG. 20.

FIG. 16 is a view illustrating a first rod according to another embodiment of the disclosure. FIG. 17 is a plan view and a side exploded view illustrating a disk of the first rod shown in FIG. 16. FIG. 18 is a view illustrating a first state of a vibration reduction apparatus having the first rod shown in FIG. 16. FIG. 19 is a cross-sectional view illustrating the vibration reduction apparatus in a state shown in FIG. 18. FIG. 20 is a view illustrating a second state of the vibration reduction apparatus having the first rod shown in FIG. 16. FIG. 21 is a cross-sectional view illustrating the vibration reduction apparatus in a state shown in FIG. 20;

Referring to FIGS. 16 to 21, a first rod according to still another embodiment of the disclosure will be described. The same reference numerals are assigned to the same configurations as those in the above-described embodiment, and detailed description thereof may be omitted.

Typically, when the rotational speed of the rotating tub 30 is about 100 rpm, excessive vibration occurs in the tub 20 due to resonance, and when the rotational speed reaches the highest rpm (about 250 rpm), the vibration of the tub 20 decreases. A general vibration reduction apparatus exerts a damping force on the tub 20 in all rpm sections, and the corresponding reaction force may cause vibration to be transmitted to the cabinet 20 even in a section where small vibrations occur in the tub 20.

The vibration reduction apparatus 80 according to the embodiment of the disclosure exerts a damping force on the tub 20 in a transient vibration section where resonance occurs to reduce the vibration of the tub 20 while exerts a small or no damping force on the tub in a section where vibration of the tub 20 is small, such as the highest rpm section, to prevent the vibration of the tub 20 from being transmitted to the cabinet 11.

To this end, the disk 87 of the first rod 81 may include a portion that differs in thickness so that the frictional force is varied according to the rotation angle of the second rod 91. Specifically, the disk 87 of the first rod 81 may include a thickness increasing portion 110 whose thickness increases so as to increase frictional force when the rotation angle of the second rod 91 increases.

When the second rod 91 rotates at a large angle and thus the friction member 99 reaches the thickness increasing portion 110 of the disk 87, the frictional force between the friction member 99 and the disk 87 may be increased. Conversely, when the friction member 99 does not reach the thickness increase portion 110 of the disk 87, the frictional force between the friction member 99 and the disk 87 may not be large or may not occur.

When a portion excluding the thickness increasing portion 110 has a thickness of T1, the thickness increasing portion 110 may have a maximum thickness of T2 greater than T1. The thickness increasing portion 110 may have a thickness that gradually increases along the circumferential direction of the disk 87 before one point to remain constant, and then from another point gradually decreases.

The thickness increasing portion 100 may include an inclined portion 111 whose thickness gradually increases or decreases along the circumferential direction of the disk 87 and a step portion 112 whose thickness is kept constant. The surface of the inclined portion 111 may be formed in a flat shape or may be smoothly formed in a curved shape. However, unlike the embodiment, the step portion 112 is omitted, and the thickness increase portion 110 may be formed to have a thickness that gradually increases along the circumferential direction of the disk 87 and at one point, gradually decreases along the circumferential direction of the disk 87.

Referring to FIGS. 18 to 21, the operation of the vibration reduction apparatus 80 will be briefly described.

FIGS. 18 and 19 are views illustrating a state (the first state) of the vibration reduction apparatus when no vibration or small vibration occurs in the tub 20, and FIGS. 20 and 21 views illustrating a state (the second state) of the vibration reduction apparatus when excessive vibration occurs in the tub 20.

In the first state, the friction member 99 of the second rod 91 may come in friction with a portion other than the thickness increasing portion 110 of the disk 87. Therefore, a relatively small frictional force may be generated.

Alternatively, in the first state, the friction member 99 of the second rod 91 may be provided to be spaced apart from the disk 87 without making friction with the disk 87. In this case, since frictional force may not be generated, vibration of the tub 20 may not be transmitted to the cabinet 11 through the vibration reduction apparatus 80.

In the second state, the friction member 99 may come in friction with the thickness increasing portion 110 of the disk 87. Therefore, a relatively large frictional force may occur.

As is apparent from the above, the vibration reduction apparatus can effectively reduce the vibration of the tub that occurs during rotation of the rotating tub.

According to the aspect of the disclosure, the vibration reduction apparatus is not connected to the suspension device, or is connected to the suspension device with a small force applied to the suspension device, so that the suspension device can be prevented from being deformed.

According to the aspect of the disclosure, the vibration reduction apparatus effectively reduces vibration of the tub in a transient vibration section in which the vibration of the tub is large due to resonance, and prevents vibration of the tub from being transmitted to the cabinet in a section in which the vibration of the tub is in a stead state, such as the highest rpm section, as in the case of having no vibration reduction apparatus.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

What is claimed is:

1. A washing machine comprising:
   a cabinet;
   a tub inside the cabinet;
   a rotating tub configured to rotate inside the tub;
   a suspension device configured to suspend the tub in the cabinet, so that the tub is supported by the cabinet; and
   a horizontal vibration reduction apparatus coupled to the tub and to a side of the cabinet and configured to reduce a horizontal vibration of the tub due to the rotation of the rotating tub, the vibration reduction apparatus including a first rod including a tub connector configured to receive a support pin to couple the first rod to the tub and connected to the side of the cabinet, the support pin inserted into the tub connector along an axis that is parallel to an exterior surface of the tub and a second rod coupled to the side of the cabinet and rotatably coupled to the first rod.

2. The washing machine of claim 1, wherein the second rod is connected to the suspension device.

3. The washing machine of claim 1, wherein the first rod includes a hinge pin and the second rod rotates around the hinge pin.

4. The washing machine of claim 1, wherein the second rod includes
   a suspension device connector configured to connect to the suspension device,
   the suspension device includes a suspension bar, and
   the suspension device connector is connected to the suspension bar so as to be movable along the suspension bar.

5. The washing machine of claim 4, wherein the suspension device connector includes a holder having a connection groove into which the suspension bar is inserted and a bracket to which the holder is rotatably coupled.

6. The washing machine of claim 3, wherein the first rod includes a disk formed at a circumference of the hinge pin, and the second rod includes a disk housing into which the disk is inserted.

7. The washing machine of claim 6, wherein
   the disk has a cylindrical shape having an upper surface, a lower surface, and a circumferential surface, and
   the disk housing includes a first wall and a second wall spaced apart from each other to form a slot into which the disk is inserted.

8. The washing machine of claim 7, further comprising a friction member inside the disk housing and configured to contact the disk and cause friction while the second rod rotates around the hinge pin.

9. The washing machine of claim 8, wherein the disk housing includes a mounting rib formed on at least one of an inner surface of the first wall or an inner surface of the second wall such that the friction member is mounted on the mounting rib.

10. The washing machine of claim 8, wherein the disk includes a disk surface that increases in thickness so that a frictional force increases according to a rotation angle of the second rod.

11. A vibration reduction apparatus for a washing machine including a cabinet, a tub inside the cabinet, and a suspension device connecting the tub to the cabinet, the vibration reduction apparatus comprising:
    a first rod including
       a tub connector configured to receive a support pin to couple the first rod to the tub, the support pin inserted into the tub connector along an axis that is parallel to an exterior surface of the tub,
       a first hinge; and
    a second rod including a suspension device connector configured to connect to the suspension device and the second rod having a second hinge rotatably coupled to the first hinge,
    wherein the first hinge includes a disk and a hinge pin on a center of the disk,
    wherein the second hinge includes a disk housing into which the disk is inserted and a hinge pin insertion hole formed in the disk housing such that the hinge pin is inserted into the hinge pin insertion hole,
    wherein the suspension device includes a suspension bar,
    wherein the suspension device connector is connected to the suspension bar so as to be movable along the suspension bar,
    wherein the vibration reduction apparatus further comprises a friction member inside the disk housing and configured to contact the disk and cause friction while the second rod rotates around the hinge pin, and
    wherein the disk includes a disk surface that increases in thickness so that a frictional force increases based on a rotation angle of the second rod.

12. A washing machine comprising:
    a cabinet having a front plate, a rear plate, a right side plate, a left side plate, and a bottom plate;
    a tub inside the cabinet;
    a rotating tub configured to rotate inside the tub;
    a plurality of suspension devices to suspend the tub in the cabinet, so that the tub is supported by the cabinet; and
    a plurality of horizontal vibration reduction apparatuses coupled to the tub and to a side of the cabinet, the plurality of horizontal vibration reduction apparatuses being in parallel with the bottom plate of the cabinet and configured to reduce a horizontal vibration of the tub resulting from the rotation of the rotating tub, the plurality of horizontal vibration reduction apparatuses including
    a first horizontal vibration reduction apparatus and a second horizontal vibration reduction apparatus, configured to extend and contract in a length direction thereof, and
    a longitudinal central axis of the first vibration reduction apparatus and a longitudinal central axis of the second vibration reduction apparatus being aligned with each other,
    wherein the plurality of suspension devices and the plurality of horizontal vibration reduction apparatuses are installed irrespective of each other.

13. The washing machine of claim 12, wherein the first horizontal vibration reduction apparatus and the second horizontal vibration reduction apparatus are coupled between the tub and the rear plate of the cabinet and are in parallel with the rear plate of the cabinet.

14. The washing machine of claim 12, wherein each of the plurality of horizontal vibration reduction apparatuses includes a cylinder with an inner space connected to the tub and a piston connected to the cabinet and configured to advance and retract in the inner space of the cylinder.

15. The washing machine of claim 12, wherein
the cabinet includes a guide bar,
the tub includes a support pin, and
each of the plurality of horizontal vibration reduction apparatuses has one end connected to the guide bar so as to be rotatable on the guide bar while moving in a vertical direction along the guide bar, and an other end connected to the support pin so as to be rotatable on the support pin while being restricted from moving in the vertical direction.

16. The washing machine of claim 12, wherein
the cabinet includes a support pin,
the tub includes a guide bar, and
each of the plurality of horizontal vibration reduction apparatuses has one end connected to the guide bar so as to be rotatable on the guide bar while moving in a vertical direction along the guide bar, and an other end connected to the support pin so as to be rotatable on the support pin while being restricted from moving in an upper side direction and a lower side direction.

* * * * *